US007655745B2

(12) United States Patent
Nakazawa et al.

(10) Patent No.: US 7,655,745 B2
(45) Date of Patent: Feb. 2, 2010

(54) POLYSILANE COMPOUND AND SYNTHESIS METHOD, ULTRAVIOLET-RAY CURABLE INK COMPOSITION, INKJET RECORDING METHOD AND APPARATUS, AND INK CONTAINER

(75) Inventors: Chiyoshige Nakazawa, Suwa (JP); Takashi Oyanagi, Shiojiri (JP); Keitaro Nakano, Matsumoto (JP); Masahiro Ueda, Kyoto (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 12/031,148

(22) Filed: Feb. 14, 2008

(65) Prior Publication Data
US 2008/0200635 A1    Aug. 21, 2008

(30) Foreign Application Priority Data
Feb. 15, 2007  (JP)  ............... 2007-035436
Feb. 12, 2008  (JP)  ............... 2008-030637

(51) Int. Cl.
C08G 77/24  (2006.01)
C08G 77/00  (2006.01)
(52) U.S. Cl. .......................... 528/42; 528/34
(58) Field of Classification Search ............. 528/42
See application file for complete search history.

(56) References Cited
U.S. PATENT DOCUMENTS
5,372,908 A * 12/1994 Hayase et al. ............... 430/192

5,623,001 A    4/1997  Figov
2006/0093933 A1 *  5/2006  Michaleviciute et al. ...... 430/72

FOREIGN PATENT DOCUMENTS
JP    3-216379   9/1991
JP    2006-028392   2/2006

* cited by examiner

Primary Examiner—Randy Gulakowsi
Assistant Examiner—Robert Loewe
(74) Attorney, Agent, or Firm—Workman Nydegger

(57) ABSTRACT

The invention relates to a polysilane compound having a structure represented by the following formula 1 and an ultraviolet ray-curable ink composition containing the polysilane compound. Also, an inkjet recording method using the ultraviolet ray-curable ink composition and an ink container and an inkjet recording apparatus each containing the ultraviolet ray-curable ink composition therein are disclosed.

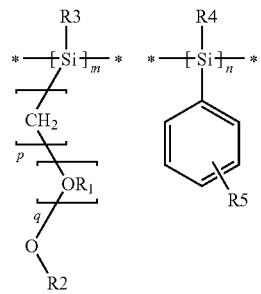

Formula 1

9 Claims, 5 Drawing Sheets

POLYSILANE COMPOUND AND SYNTHESIS METHOD, ULTRAVIOLET-RAY CURABLE INK COMPOSITION, INKJET RECORDING METHOD AND APPARATUS, AND INK CONTAINER

FIELD OF THE INVENTION

The present invention relates to a polysilane compound and a synthesis method thereof and to an ultraviolet ray-curable ink composition using the polysilane compound. In detail, the invention relates to a novel polysilane compound and a synthesis method thereof and to an ink composition using the polysilane compound, the ink composition being an ultraviolet ray-curable ink composition which is curable with active rays such as ultraviolet rays, has a high rate of curing (polymerization), has excellent storage stability and even when stored at high temperatures, is low in an increase of viscosity.

Also, the invention relates to an inkjet recording method using the ultraviolet ray-curable ink composition and to an ink container and an inkjet recording apparatus each containing the ultraviolet ray-curable ink composition therein.

BACKGROUND OF THE INVENTION

An inkjet recording method is a printing method for performing printing by flying small droplets of an ink composition and making them adhere to a recording medium such as paper. This inkjet recording method has a characteristic feature that an image with high dissolution and high definition can be printed at a high speed. In general, an ink composition to be used in the inkjet recording method contains an aqueous solvent as a major component and further contains a colorant component and a wetting agent such as glycerin for the purpose of preventing clogging from occurring.

Also, in the case where printing is performed on a recording medium into which an aqueous ink composition hardly penetrates, for example, papers and cloths, or plates or films manufactured from a raw material of a metal or a plastic in which an aqueous ink composition does not penetrate, for example, phenol resins, melamine resins, vinyl chloride resins, acrylic resins and polycarbonate resins, the ink composition is required to contain a component capable of stably fixing a colorant to the recording medium. In particular, in the case where printing is performed on a printed wiring board, etc., the ink composition is required to have quick-drying properties or chemical resistance.

In order to meet these requirements, an ink composition containing a component which is polymerized upon irradiation with ultraviolet rays has hitherto been proposed (see, for example, Patent Document 1). An ultraviolet ray-curable ink composition containing a colorant, an ultraviolet ray absorber, a photopolymerization initiator and so on has also been proposed (see, for example, Patent Document 2). According to these ink compositions and inkjet recording methods, it is considered that bleeding of the ink composition into the recording medium can be prevented, thereby enhancing the image quality.

In the foregoing inkjet recording method using an ink composition containing a component which is polymerized upon irradiation with ultraviolet rays, after making the ink composition adhere to the recording medium, ultraviolet rays are irradiated. Then, the photopolymerization initiator in the ink composition produces a radical, etc., whereby an oligomer or a monomer starts polymerization and is cured. Therefore, the colorant in the ink composition is fixed onto the recording medium. It is thought that according to this fixing, printing with high film strength, solvent resistance and color density and less bleeding and unevenness can be realized.

As to the related-art ultraviolet ray-curable ink compositions, in general, those having high curing properties were low in storage stability, and a viscosity thereof increased with a lapse of time. When stored at high temperatures, they caused gelation so that not only they could not be applied to inkjet recording, but they could not be used by other recording methods. Conversely, when the storage stability was increased, the curing properties were lowered, and strong irradiation with ultraviolet rays was necessary. As a result, the device became large in size, or the consumed electric power increased. Therefore, such was not favorable.

It is thought that this is caused due to the matter that not only the photopolymerization initiator in the ink composition generates a radical, etc. due to irradiation with ultraviolet rays, but it generates a radical, etc. by thermal energy.

Patent Document 1: JP-A-3-216379
Patent Document 2: U.S. Pat. No. 5,623,001

SUMMARY OF THE INVENTION

As described previously, in order to meet the requirement for making an enhancement in rate of polymerization and an enhancement in storage stability compatible with each other, various attempts were made. However, the development of an ink composition capable of making "high rate of polymerization" and "high storage stability" compatible with each other has not been successfully achieved yet.

Accordingly, in order to solve the foregoing problems, the invention has been made. An object of the invention is to provide a novel polysilane compound and a synthesis method thereof and to provide an ultraviolet ray-curable ink composition using the polysilane compound, which has a high rate of curing (polymerization), has excellent storage stability and even when stored at high temperatures, is low in an increase of viscosity.

Also, another object of the invention is to provide an inkjet recording method using the foregoing ultraviolet ray-curable ink composition and an ink container and an inkjet recording apparatus each containing the ultraviolet ray-curable ink composition therein.

The present inventor made extensive and intensive investigations. As a result, it has been found that the foregoing objects can be achieved by using a novel polysilane having a special structure as a photopolymerization initiator, leading to accomplishment of the invention.

Specifically, the invention is as follows.

(1) A polysilane compound having a structure represented by the following formula 1.

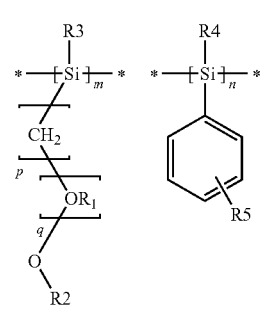

Formula 1

In the formula 1, $\underline{m}$ and $\underline{n}$ each represents a molar ratio and is a positive number which is satisfied with $(m+n)=1$. $\underline{p}$ represents an integer of 2 or more and not more than 10. q represents an integer of 0 or more and not more than 5.

R1 represents —CH$_2$CH$_2$— or —CH$_2$CH(CH$_3$)—.

R2 and R3 each independently represents an alkyl group having from 1 to 12 carbon atoms, a phenyl group or a benzyl group. The phenyl group and the benzyl group may be each further substituted with a substituent X1.

R4 represents a phenyl group. The phenyl group may be further substituted with a substituent X1.

R5 represents an alkyl group having from 1 to 12 carbon atoms, an alkoxy group having from 1 to 12 carbon atoms, a halogen group, a cyano group, an acyl group, an acyloxy group, a benzoyl group or a nitro group.

The substituent X1 represents an alkyl group having from 1 to 12 carbon atoms, an alkoxy group having from 1 to 12 carbon atoms, a halogen group, a cyano group, an acyl group, an acyloxy group, a benzoyl group or a nitro group.

(2) The polysilane compound as set forth above in (1), having a maximum absorption coefficient at from 290 nm to 410 nm of 1,000 or more.

(3) The polysilane compound as set forth above in (1) or (2), having an average molecular weight of 5,000 or more.

(4) The polysilane compound as set forth above in any one of (1) to (3), which is soluble in a hydrophilic acrylate.

(5) A synthesis method of the polysilane compound as set forth above in any one of (1) to (4), comprising synthesizing a monomer by using a bromide as a starting raw material and then performing copolymerization using the monomer.

(6) An ultraviolet ray-curable ink composition containing the polysilane compound as set forth above in any one of (1) to (4).

(7) An inkjet recording method using the ultraviolet ray-curable ink composition as set forth above in (6).

(8) An ink container containing the ultraviolet ray-curable ink composition as set forth above in (6) therein.

(9) An inkjet recording apparatus containing the ultraviolet ray-curable ink composition as set forth above in (6) therein.

The action mechanism of the invention is not always elucidated yet. However, it is estimated that when an ultraviolet ray-curable ink composition contains the foregoing novel polysilane compound, the rate of curing (polymerization) can be increased due to its action as a photopolymerization initiator, and in view of the matter that this compound is a polysilane compound having high thermal stability, it is free from decomposition by thermal energy and does not produce a radical, etc., whereby the storage stability can be enhanced.

By using the novel polysilane compound of the invention, it is possible to provide an ultraviolet ray-curable type having a high rate of curing (polymerization) and excellent storage stability.

DETAILED DESCRIPTION OF THE INVENTION

Figure 1:
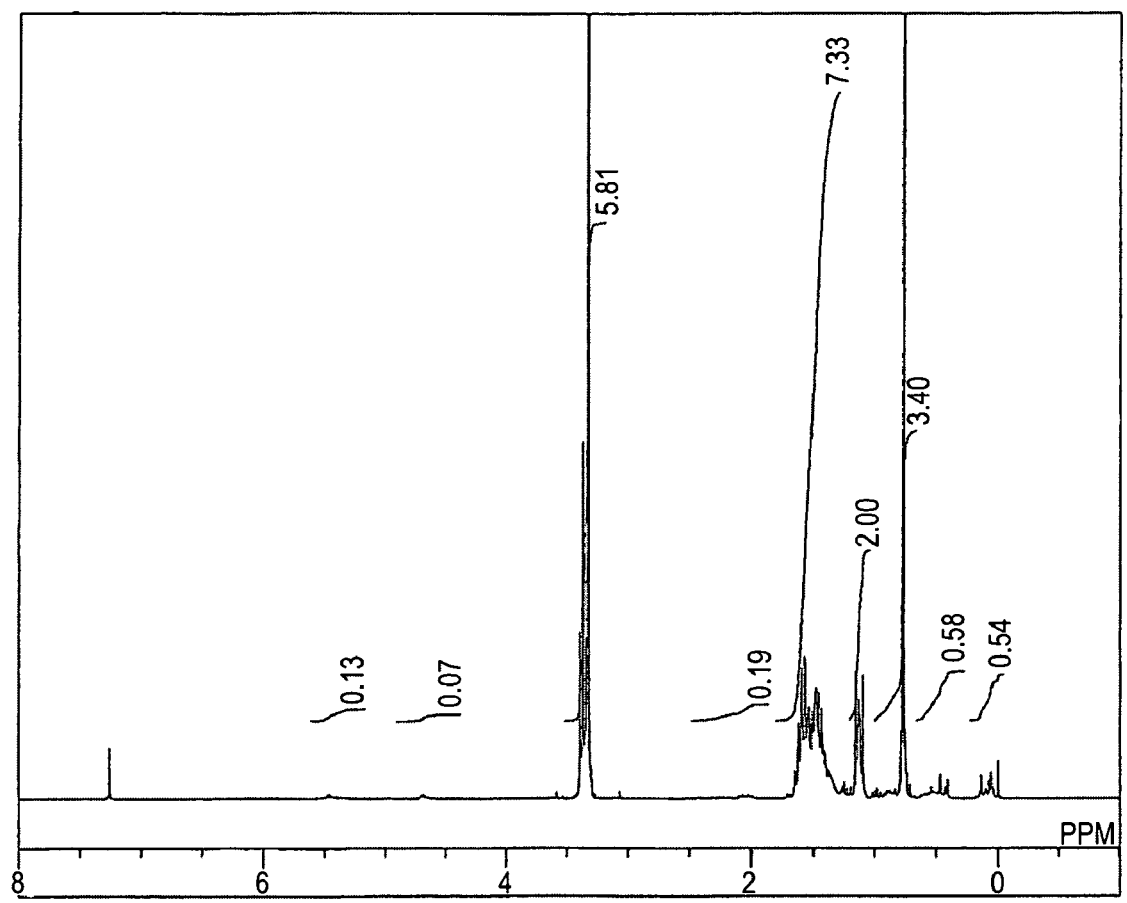
FIG. 1 is a chart of $^1$HNMR of a dichlorosilane compound (aliphatic monomer (A1)) obtained in Synthesis Example 1.

A polysilane compound having a structure represented by the following formula 1 of the invention is hereunder described in detail.

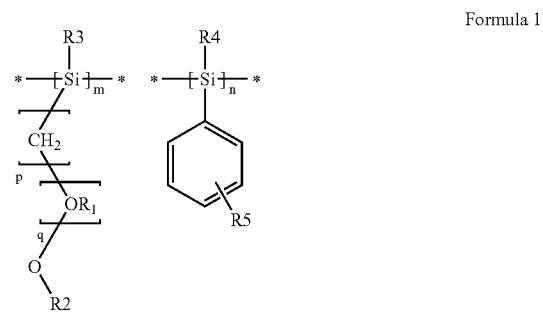

Formula 1

[In the formula 1, m and n each represents a molar ratio and a positive number which is satisfied with (m+n)=1. p represents an integer of 2 or more and not more than 10. q represents an integer of 0 or more and not more than 5.

R1 represents —CH$_2$CH$_2$— or —CH$_2$CH(CH$_3$)—.

R2 and R3 each independently represents an alkyl group having from 1 to 12 carbon atoms, a phenyl group or a benzyl group. The phenyl group and the benzyl group may be each further substituted with a substituent X1.

R3 represents a phenyl group. The phenyl group may be further substituted with a substituent X1.

R5 represents an alkyl group having from 1 to 12 carbon atoms, an alkoxy group having from 1 to 12 carbon atoms, a halogen group, a cyano group, an acyl group, an acyloxy group, a benzoyl group or a nitro group.

The substituent X1 represents an alkyl group having from 1 to 12 carbon atoms, an alkoxy group having from 1 to 12 carbon atoms, a halogen group, a cyano group, an acyl group, an acyloxy group, a benzoyl group or a nitro group.]

The alkyl group represented by R2, R3, R5 and X1 is preferably a linear or branched alkyl group having from 1 to 12 carbon atoms; more preferably a linear or branched alkyl group having from 1 to 10 carbon atoms; and further preferably a methyl group, an ethyl group, a propyl group, an isopropyl group, an n-butyl group, an isobutyl group, a sec-butyl group, a t-butyl group, a pentyl group, a hexyl group, a heptyl group, an octyl group, a nonyl group or a decyl group. Such an alkyl group may further have a substituent.

Examples of a halogen atom in the halogen group represented by R5 and X1 include a chlorine atom, a bromine atom, a fluorine atom and an iodine atom. Also, examples of the alkoxy group include those having from 1 to 4 carbon atoms, for example, a methoxy group, an ethoxy group, a propoxy group and a butoxy group; examples of the acyl group include a formyl group and an acetyl group; and examples of the acyloxy group include an acetoxy group.

In the polysilane compound according to the invention, from the viewpoint of photo-reactivity, its maximum absorption coefficient at from 290 nm to 410 nm is preferably 1,000 or more, and more preferably 5,000 or more. Also, from the viewpoint of photo-reactivity, its average molecular weight is preferably 5,000 or more, more preferably 10,000 or more, and especially preferably 200,000 or more.

Also, it is preferable that the foregoing polysilane compound is soluble in a hydrophilic acrylate which is preferable as a film component of the ink in an amount of 0.01% by mass or more and to an extent that it is not deposited in a usual ink composition concentration and can be made soluble by adequately choosing the molecular weight and the substituent represented by R1 to R5.

The foregoing polysilane compound can be synthesized by a process as described below using a bromide as a starting raw material. By choosing a bromide as the starting raw material, there is brought an advantage that the polysilane compound is obtainable simply and at low costs. The synthesis method is described while taking the case where the repeating units are the following (A) and (B) as an example.

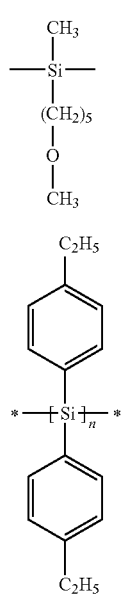

Synthesis of Monomer Corresponding to Repeating Unit A

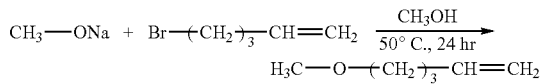

Synthesis of Silane Compound Corresponding to Repeating Unit A

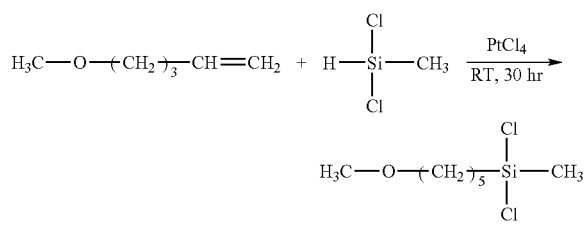

Synthesis of Polysilane Copolymer

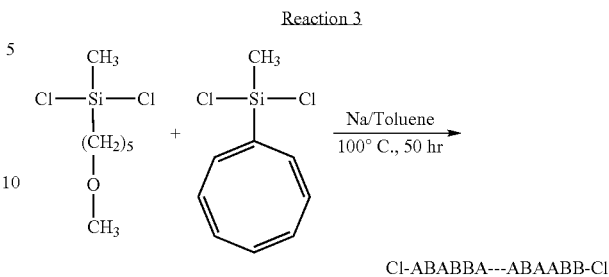

The foregoing reaction 3 follows a reaction as described in R. West, et al., *J. Radiation Curing*, 13, 35 (1986). Though the polysilane copolymer obtained by the foregoing reactions is a random copolymer, by copolymerizing an oligomer composed of the repeating unit A and an oligomer composed of the repeating unit B, it is also possible to synthesize a polysilane block copolymer, for example, "-AAABBB-BAAABBBB-".

The foregoing repeating unit (A) in the polysilane copolymer of the invention is preferably contained in an amount of from 10 to 90% by mole (namely, m=0.1 to 0.9), and more preferably from 40 to 60% by mole (namely, m=0.4 to 0.6).

The polysilane compound of the invention can be used as a photopolymerization initiator for ultraviolet ray-curable adhesives, ultraviolet ray-curable paints, ultraviolet ray-curable covering agents, ultraviolet ray-curable hard coating agents, ultraviolet ray-curable ink compositions and the like. In particular, by using the polysilane compound of the invention for an ultraviolet ray-curable ink composition, an ink composition which has a high rate of curing, has excellent storage stability and even when stored at high temperatures, is low in an increase of viscosity is obtainable.

The ultraviolet ray-curable ink composition of the invention (hereinafter also referred to simply as "ink composition") is hereunder described in detail.

The foregoing polysilane copolymer may be used as a photopolymerization initiator singly or as a mixture with other initiator. However, in order to achieve the object of the invention that the ink composition has a high rate of curing (polymerization), has excellent storage stability and even when stored at high temperatures, is low in an increase of viscosity, it is preferable that the polysilane copolymer is used singly. Representative examples of the photopolymerization initiator which can be used jointly include benzoinmethyl ether, benzoinethyl ether, isopropylbenzoin ether, isobutylbenzoin ether, 1-phenyl-1,2-propanedione-2-(o-ethoxycar bony)oxime, benzil, diethoxyacetophenone, benzophenone, chlorothioxanthone, 2-chlorothioxanthone, isopropylthioxanthone, 2-methylthioxanthone, polychloropolyphenyl and hexachlorobenzene.

Also, photopolymerization initiators which are commercially available as trade names of VICURE 10 and 30 (manufactured by Stauffer Chemical), IRGACURE 184, 651, 2959, 907, 369, 1700, 1800, 1850 and 819 (manufactured by Ciba Specialty Chemicals), DAROCURE 1173 (manufactured by EM Chemical), QUANTACURE CTX and ITX (manufactured by Aceto Chemical) and LUCIRIN TPO (manufactured by BASF) can be used jointly.

The total amount of the polymerization initiators is preferably from 0.1 to 10% by mass, and more preferably from 1 to 5% by mass relative to the whole amount of the ink composition.

The major component other than the photopolymerization initiator to be contained in the ink composition of the invention is a polymerizable compound. The polymerizable compound is not particularly limited so far as it is a compound capable of generating a polymerization reaction and curing upon being given any energy, and any compound can be used irrespective of species of monomer, oligomer or polymer. In particular, various publicly known polymerizable monomers capable of generating a polymerization reaction due to an initiation species to be generated from the photopolymerization initiator, which are known as a photo-cationic polymerizable monomer or a photo-radical polymerizable monomer, are preferable.

The polymerizable compound can be used singly or in admixture of plural kinds thereof for the purpose of adjusting a rate of reaction, physical properties of the ink, physical properties of the cured film, etc.

Any of monofunctional monomers, bifunctional monomers and trifunctional or polyfunctional monomers as described in JP-A-2006-28392 can be used as the monomer.

It is preferable that all of the monomers have a primary irritation index (PII) of not more than 2.

Also, from the viewpoint of realizing a low viscosity of the ink composition, it is preferable that the use amount of the bifunctional monomer and the polyfunctional monomer is low as far as possible.

Monofunctional monomers, bifunctional monomers and polyfunctional monomers each having a PII value of not more than 2, which can be used in the ink composition of the invention, are exemplified in Table 1.

TABLE 1

| [Substance name] | Viscosity (mPa · s) | P.I.I. |
|---|---|---|
| Monofunctional monomer | | |
| (2-Methyl-2-ethyl-1,3-dioxolan-4-yl)methyl methacrylate (MEDOL-10, available from Osaka Organic Chemical Industry Ltd.): | 5.1 | 1.3 |
| (2-Methyl-2-isobutyl-1,3-dioxolan-4-yl)methyl acrylate (MIBDOL-10, available from Osaka Organic Chemical Industry Ltd.): | 5.3 | 1.0 |
| Phenoxyethyl acrylate (VISCOAT #192, available from Osaka Organic Chemical Industry Ltd.): | 3.3 | 1.7 |
| Isobonyl acrylate (IBXA, available from Osaka Organic Chemical Industry Ltd.): | 2.6 | 0.6 |
| Methoxy diethylene glycol monoacrylate (BLEMMER PME-100, available from NOF Corporation): | 2 | 0.7 |
| Acryloyl morpholine (ACMO, available from Kohjin Co., Ltd.): | 12 | 0.5 |
| Bifunctional monomer | | |
| Ethylene glycol dimethacrylate (LIGHT-ESTER EG, available from Kyoeisha Chemical Co., Ltd.): | 3 | 0.6 |
| Diethylene glycol dimethacrylate (LIGHT-ESTER 2EG, available from Kyoeisha Chemical Co., Ltd.): | 5 | 0.5 |
| Tripropylene glycol diacrylate (ARONIX M-220, available from Toagosei Co., Ltd.): | 12 | 1.6 |
| 1,9-Nonanediol diacrylate (VISCOAT #260, available from Osaka Organic Chemical Industry Ltd.): | 21 | 2.0 |
| Polyethylene glycol #400 diacrylate (NK ESTER A400, available from Shin-Nakamura Chemical Co., Ltd.): | 58 | 0.4 |
| Tetraethylene glycol dimethacrylate (NK ESTER 4G, available from Shin-Nakamura Chemical Co., Ltd.): | 14 | 0.5 |
| 1,6-Hexanediol dimethacrylate (NK ESTER HD-N, available from Shin-Nakamura Chemical Co., Ltd.): | 6 | 0.5 |
| Neopentyl glycol dimethacrylate (NK ESTER NPG, available from Shin-Nakamura Chemical Co., Ltd.): | 7 | 0.0 |
| 2-Hydroxy-1,3-dimethacryloxypropane (NK ESTER 701, available from Shin-Nakamura Chemical Co., Ltd.): | 37 | 0.6 |
| 1,4-Butanediol dimethacrylate (BD, available from Shin-Nakamura Chemical Co., Ltd.): | 7 | 2.0 |
| Polyfunctional monomer | | |
| Trimethylolpropane trimethacrylate (NK ESTER TMPT, available from Shin-Nakamura Chemical Co., Ltd.): | 42 | 0.8 |
| Trimethylolpropane modified triacrylate (VISCOAT #360, available from Osaka Organic Chemical Industry Ltd.): | 55 | 1.5 |
| Trimethylolpropane PO-modified triacrylate (NEW FRONTIER TMP-3P, available from Dai-ichi Kogyo Seiyaku Co., Ltd.): | 60 | 0.1 |
| Glycerin PO-modified triacrylate (VISCOAT #GPT, available from Osaka Organic Chemical Industry Ltd.): | 75 | 0.8 |

The viscosities in the foregoing table are a measured value at 25° C.

Also, the ink composition of the invention may contain an oligomer other than the foregoing monomer as the polymerizable compound.

The oligomer which can be used in the ink composition of the invention is a molecule having a medium-class relative molecular mass and refers to one having a structure constituted by a small number of repetitions, generally from about 2 to 20 repetitions, of a unit obtained substantially or conceptionally from a molecule having a small relative molecular mass. Also, the oligomer which is used in the invention is called a photopolymerizable prepolymer, a base lysine or an acrylic oligomer.

Since the oligomer has from one to several acryloyl groups as a functional group, it has properties that a polymerization reaction with a monomer, etc. is generated upon irradiation with ultraviolet rays or other means to cause crosslinking and polymerization.

Examples of the oligomer which is used in the invention include polyester acrylates, polyurethane acrylates, epoxy acrylates, polyether acrylates, oligo acrylates, alkyd acrylates and polyol acrylates depending upon the molecular structure which constitutes a skeleton. Of these, polyester acrylates and polyurethane acrylates are preferable.

As the oligomer which is used in the invention, ones having a molecular weight in the range of from about 500 to 20,000, and preferably in the range of from about 5,000 to 10,000 are useful.

The ink composition of the invention may further contain a dendritic polymer as the polymerizable compound. The dendritic polymer can be roughly classified into six structures as described below (see Keigo AOI and Masaaki KAKIMOTO Ed., *Dendritic Polymers—Highly functionalized world by which the multi-branched structure is widened*—(in Japanese), published by NTS Inc.).

I: Dendrimer
II: Linear dendritic polymer
III: Dendri-graft polymer
IV: Hyperbranched polymer
V: Star-hyperbranched polymer
VI: Hyper-graft polymer Of these, I to III have a degree of branching (DB) of 1 and have a defect-free structure, whereas IV to VI have a random branched structure which may contain a defect. In particular, as compared with generally used linear high-molecular weight compounds, a dendrimer has a possibility to dispose a reactive functional group in a high density and with concentration on the outermost plane thereof and is highly expected as a functional high-molecular weight material. Also, a hyperbranched polymer, a dendri-graft polymer and a hyper-graft polymer are not comparable to the dendrimer but have a possibility to introduce a number of reactive functional groups on the outermost layer thereof and have excellent curing properties.

Different from conventional linear high-molecular weight compounds or branched high-molecular weight compounds, these dendritic polymers repeat a three-dimensional branched structure and are highly branched. For that reason, as compared with linear high-molecular weight compounds having the same molecule, the dendritic polymers have a possible to control the viscosity on a low level.

Examples of a synthetic method of a dendrimer which can be used in the invention include a divergent method in which the synthesis is performed from the center toward the outside and a convergent method in which the synthesis is performed from the outside toward the center.

As the dendrimer, hyperbranched polymer, dendri-graft polymer and hyper-graft polymer which can be used in the invention, ones which are a solid at room temperature and which have a number average molecular weight in the range of from 1,000 to 100,000 are desirable; and in particular, ones having a number average molecular weight in the range of from 2,000 to 50,000 are preferably used. In the case where the polymer is not a solid at room temperature, the maintenance properties of a formed image become worse. Also, in the case where the molecular weight is lower than the foregoing range, a fixed image becomes brittle; whereas in the case where the molecular weight exceeds the foregoing range, even when the addition amount is decreased, the viscosity of an ink is excessively high so that the ink is not practically useful in view of a flying characteristic.

Also, the dendrimer, hyperbranched polymer, dendri-graft polymer and hyper-graft polymer which can be used in the invention are preferably a dendrimer, a hyperbranched polymer, a dendri-graft polymer and a hyper-graft polymer, respectively, each of which has a radical polymerizable functional group on the outermost plane thereof. By employing a structure in which radical polymerization can be achieved on the outermost plane thereof, a polymerization reaction rapidly proceeds.

Examples of the polymer having a dendrimer structure include amidoamine based dendrimers (as described in U.S. Pat. Nos. 4,507,466, 4,558,120, 4,568,737, 4,587,329, 4,631, 337 and 4,694,064) and phenyl ether based dendrimers (as described in U.S. Pat. No. 5,041,516 and *Journal of American Chemistry*, Vol. 112, pages 7638 to 7647 (1990)). As to the amidoamine based dendrimer, a dendrimer having a terminal amino group and a methyl carboxylate group is commercially available as "STARBURST™ (PAMAM)" from Aldrich. Also, the terminal amino group of such an amidoamine based dendrimer can be allowed to react with an acrylic acid derivative or a methacrylic acid derivative of every kind to synthesize an amidoamine based dendrimer having a corresponding terminal, which is then provided for use.

Examples of the acrylic acid derivative or methacrylic acid derivative which can be used include acrylic acid or methacrylic acid alkyl esters of methyl, ethyl, n-butyl, t-butyl, cyclohexyl, palmityl, stearyl, etc.; and acrylic acid or methacrylic acid alkylamides of acrylamide, isopropylamide, etc.

Also, as to the phenyl ether based dendrimer, various compounds are described in, for example, *Journal of American Chemistry*, Vol. 112, pages 7638 to 7647 (1990). For example, it is described that 3,5-dihydroxybenzyl alcohol is used and allowed to react with 3,5-diphenoxybenzyl bromide to synthesize a second-generation benzyl alcohol; an OH group thereof is converted to Br by using $CBr_4$ and triphenylphosphine; thereafter, the resulting benzyl alcohol is similarly allowed to react with 3,5-dihydroxybenzyl alcohol to synthesize a next-generation benzyl alcohol; and subsequently, the foregoing reactions are repeated to synthesize a desired dendrimer. As to the phenyl ether based dendrimer, the terminal can be substituted with one having a chemical structure of every kind in place of the terminal benzyl ether linkage. For example, in synthesizing the dendrimer as described in *Journal of American Chemistry*, Vol. 112, pages 7638 to 7647 (1990), by using an alkyl halide of every kind in place of the foregoing benzyl bromide, a phenyl ether based dendrimer having a terminal structure having a corresponding alkyl group is obtainable. Besides, polyamine based dendrimers (as described in *Macromol. Symp.*, 77, 21 (1994)) and derivatives thereof having a modified terminal group can be used.

As the hyperbranched polymer, for example, hyperbranched polyethylene glycol can be used. The hyperbranched polymer is one obtained by synthesizing a target polymer in one stage by using a monomer having two or more reaction points of one kind corresponding to a branched portion and only one reaction point of another kind corresponding to a connecting portion in one molecule thereof (Non-Patent Document 3 (*Macromolecules*, Vol. 29, pages 3831 to 3838 (1996)). Examples of a monomer for the hyperbranched polymer include 3,5-dihydroxybenzoic acid derivatives. When an example of the production of the hyperbranched polymer is concerned, poly[bis(triethylene glycol)benzoate] which is a hyperbranched polymer can be synthesized by heating methyl 3,5-bis((8'-hydroxy-3',6'-dioxaoctyl)oxy) benzoate which is a hydrolyzate of methyl 3,5-bis((8'-(t-butyldiphenyloxy)-3',6'-dioxaoctyl)oxy)benzoate obtainable from 1-bromo-8-(t-butyldiphenyloxy)-3,6-dioxaoctane and methyl 3,5-dihydroxybenzoate together with dibutyltin diacetate under a nitrogen atmosphere.

In the case where 3,5-dihydroxybenzoic acid is used, since the hyperbranched polymer terminal group is a hydroxyl group, a hyperbranched polymer having a terminal group of every kind can be synthesized by using an appropriate alkyl halide with respect to this hydroxyl group.

In a monodispersed polymer or hyperbranched polymer having a dendrimer structure or the like, its characteristic is dominated by a chemical structure of the principal chain and a chemical structure of the terminal group. In particular, its characteristic is largely different depending upon a difference of the terminal group or the substituent in the chemical structure. In particular, a polymer having a polymerizable group in a terminal thereof has a large gelation effect after photoreaction and is useful because of its reactivity. The dendrimer having a polymerizable group is obtained through chemical modification with a polymerizable group-containing compound in a terminal of a polymer having a basic atomic group, for example, an amino group, a substituted amino group and a hydroxyl group, in a terminal thereof.

For example, the dendrimer having a polymerizable group is synthesized by adding, for example, an isocyanate group-containing vinyl compound to a polyfunctional compound obtained by subjecting an amino based dendrimer to Michael addition with an active hydrogen-containing (meth)acrylate based compound. Also, a dendrimer having a polymerizable group in a terminal thereof is obtained by allowing an amino based dendrimer to react with (meth)acrylic acid chloride, etc. Examples of such a vinyl compound capable of giving a polymerizable group include compounds having a radical polymerizable, ethylenically unsaturated bond. Examples of such a compound having a radical polymerizable, ethylenically unsaturated bond include unsaturated carboxylic acids, for example, acrylic acid, methacrylic acid, itaconic acid, crotonic acid, isocrotonic acid and maleic acid, and salts thereof; and various compounds having a radical polymerizable, ethylenically unsaturated bond as described later.

Furthermore, examples of the polymerizable group include cationic polymerizable group-containing terminal groups. Such a terminal group can be introduced by allowing a compound having a polymerizable group which is polymerized upon cationic polymerization (for example, an epoxy group and an oxetanyl group), such as cyclic ether compounds (for example, oxirane and oxetane), alicyclic polyepoxides, polyglycidyl esters of a polybasic acid and polyglycidyl ethers of a polyhydric alcohol, to react with the foregoing amino based dendrimer. For example, by allowing chloromethyl oxirane to react with the amino based dendrimer, a cationic polymerizable group of an epoxy type can be introduced in a terminal thereof. Besides, examples of the terminal group include cationic polymerizable groups selected among styrene derivatives, vinylnaphthalene derivatives, vinyl ethers and N-vinyl compounds.

In the invention, an allyl group-containing compound or an N-vinyl group-containing compound is preferably used as the polymerizable compound.

In the invention, the allyl group-containing compound as the polymerizable compound is a general term for compounds having a 2-propenyl structure (—$CH_2CH=CH_2$) The 2-propenyl group is also called an allyl group and considered to be a trivial name according to the IUPAC nomenclature.

Examples of the allyl group-containing compound include allyl glycol (manufactured by Nippon Nyukazai Co., Ltd.); trimethylolpropane diallyl ether, pentaerythritol triallyl ether and glycerin monoallyl ether (all of which are manufactured by Daiso Co., Ltd.); and allyl group-containing polyoxyalkylene compounds available as trade names including UNIOX, UNILUB, POLYCERIN and UNISAFE (all of which are manufactured by NOF Corporation).

In the invention, examples of the N-vinyl group-containing compound include N-vinylformamide, N-vinylcarbazole, N-vinylacetamide, N-vinylpyrrolidone, N-vinylcaprolactam and derivatives thereof. Of these, N-vinylformamide is especially preferable.

The colorant which is used in the ink composition of the invention may be any of a dye and a pigment. In the case where the penetration of a coloring component in the ink composition is inhibited by the action of insolubilization or thickening of the ink composition or the like, the pigment which is dispersed in the ink is more advantageous than the dye which is dissolved in the ink.

As the dye to be used, various dyes which are usually used in the inkjet recording, for example, direct dyes, acid dyes, food dyes, basic dyes, reactive dyes, disperse dyes, vat dyes, soluble vat dyes and reactive disperse dyes can be used.

As the pigment to be used, inorganic pigments and organic pigments can be used without particular limitations.

As the inorganic pigment, in addition to titanium oxide and iron oxide, carbon blacks as produced by a publicly known method such as a contact method, a furnace method and a thermal method can be used. Also, as the organic pigment, azo pigments (including azo lakes, insoluble azo pigments, condensed azo pigments and chelate azo pigments), polycyclic pigments (for example, phthalocyanine pigments, perylene pigments, perinone pigments, anthraquinone pigments, quinacridone pigments, dioxazine pigments, thioindigo pigments, isoindolinone pigments and quinoflarone pigments), dye chelates (for example, basic dye type chelates and acid dye type chelates), nitro pigments, nitroso pigments, aniline black, etc. can be used.

In order to enhance the preservability of the ink composition, a polymerization inhibitor can be added in an amount of from 200 to 20,000 ppm as other component. Since it is preferable that an ultraviolet ray-curable ink is injected after reducing the viscosity upon heating, it is preferable to charge a polymerization inhibitor for the purpose of preventing head clogging by thermal polymerization or the like.

Besides, a surfactant, a leveling additive, a matting agent, a polyester based resin for the purpose of adjusting physical properties of the film, a polyurethane based resin, a vinyl based resin, an acrylic resin, a rubber based resin and a wax can be added as the need arises. In order to improve adhesion to a recording medium, it is also effective to add a trace amount of an organic solvent. In that case, it is effective to add the organic solvent in an amount falling within the range where a problem is not caused with respect to solvent resistance or VOC, and its amount is from 0.1 to 5%, and preferably from 0.1 to 3%.

Also, it is preferable in view of use that the ink composition of the invention has a viscosity of not more than 100 mPa·s at 25° C.

The ink composition of the invention can be applied to all of publicly known customary image recording and printing methods. The ink composition of the invention can be applied to image recording and printing methods, for example, an inkjet method, an offset method, a gravure method and a thermal transfer method. In particular, the ink composition of the invention is suitable for inkjet recording.

In the inkjet recording method using the ink composition of the invention, the ink composition is made to adhere to a recording medium, and ultraviolet rays are then irradiated. The photopolymerization initiator generates a radical, etc. by the irradiated ultraviolet rays, and according to this, the monomer (in case of containing the oligomer, inclusive of the oligomer, too) initiates the polymerization reaction, whereby the ink composition is fixed to the recording medium. It is thought that according to this, sharp printing can be achieved with excellent film strength and solvent resistance even on a surface of a medium into which an aqueous medium cannot penetrate, such as metals and plastics.

According to a preferred embodiment of the invention, in case of performing irradiation with ultraviolet rays, the irradiation with ultraviolet rays is performed at a dose of 100 mJ/cm² or more (preferably 500 mJ/cm² or more) and not more than 10,000 mJ/cm² (preferably not more than 5,000 mJ/cm²). What the dose of ultraviolet rays falls within the foregoing range is advantageous because the curing reaction can be sufficiently carried out, and color fading of the coloring agent to be caused due to the irradiation with ultraviolet rays can be prevented from occurring.

Examples of a light source of the irradiation with ultraviolet rays include lamps, for example, a metal halide lamp, a xenon lamp, a carbon arc lamp, a chemical lamp, a low-pressure mercury vapor lamp and a high-pressure mercury vapor lamp. The irradiation with ultraviolet rays can be performed by using a lamp which is commercially available from Fusion System Co., for example, an H lamp, a D lamp and a V lamp.

Also, the irradiation with ultraviolet rays can be performed by an ultraviolet light emitting semiconductor device such as an ultraviolet light emitting diode (ultraviolet LED) and an ultraviolet light emitting semiconductor laser.

Also, in the inkjet recording method using the ink composition of the invention, heating may be performed simultaneously with or after the irradiation with ultraviolet rays.

Examples of a method for performing heating include a method for heating while bringing a heat source into contact with the recording medium; and a method for heating upon irradiation with infrared rays, a microwave (for example, electromagnetic waves having a maximum wavelength of about 2,450 Mhz), etc. or blowing hot air without contacting it with the recording medium.

Also, the ultraviolet ray-curable ink composition of the invention can be contained in publicly known and customary ink contained and inkjet recording apparatus and provided for use.

Furthermore, it is also applicable to a colorant-free clear ink.

EXAMPLES

The present invention will be illustrated in greater detail with reference to the following examples, but the invention should not be construed as being limited thereto.

Synthesis Example 1

Synthesis of Aliphatic Monomer (A1)

A round-bottom flask, an intensive stirrer and an oil bath were prepared. A Dimroth condenser capable of being sealed with an inert gas and a dropping funnel were installed in the round-bottom flask, and after putting a stirrer chip therein, the inside of the flask was subjected to deoxidation by using a vacuum pump. After returning the inside of the flask to atmospheric pressure by using an inert gas, a solution of 5-bromopentene (125 g, 0.840 moles) in methanol (250 g) was charged in the flask by using a syringe such that oxygen was not incorporated thereinto. Furthermore, sodium methylate (54.25 g, 1.008 moles) was charged as a 28% by mass methanol solution (193.75 g) thereof in the dropping funnel by using a syringe such that oxygen was not incorporated thereinto. The alcoholate solution in the dropping funnel was gradually dropped into the flask under ice cooling, and the mixture was stirred for 2 hours. Thereafter, stirring was continued at room temperature for 2 hours and at about 50° C. overnight. It was confirmed by gas chromatography (GC) that the raw material 5-bromopentene did not remain, and the reaction solution was added in 500 mL of water. This solution was transferred into a one-liter separatory funnel, and 500 mL of hexane was further added thereto. The mixture was vigorously shaken, and the hexane layer was taken. A hexane layer obtained by repeating again a liquid separation operation was gathered with the previously obtained hexane layer, and the mixture was washed with pure water. Washing with pure water was again repeated, and after confirming by GC that methanol did not remain, the hexane layer was taken out and dehydrated over sodium sulfate. After allowing to stand for about one hour, the resulting hexane layer was filtered to obtain a hexane solution of a precursor A as the desired compound. As a result of measurement of a mass spectrum by GCMS, it was confirmed that the mass spectrum of the obtained compound has the same characteristic feature as a mass spectrum of the desired compound as described in documents.

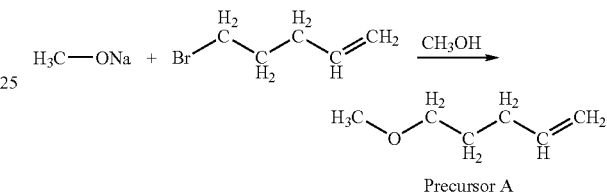

Precursor A (Synthesis of Aliphatic Monomer (A1))

A round-bottom flask and an oil bath were prepared. A Dimroth condenser capable of being sealed with an inert gas was installed in the round-bottom flask, and a stirrer chip was put therein. The inside of the flask was subjected to deoxidation by using a vacuum pump. After returning the inside of the flask by using an inert gas, a hexane solution of the high-purity olefin compound (precursor A) obtained in the previous reaction was charged in the flask by using a syringe such that oxygen was not incorporated thereinto. Thereafter, dichloromethylsilane of about 1.5 times by mole or more of the olefin compound in the hexane solution (96.6 g or more or 0.840 moles or more) was charged in the flask by using a syringe such that oxygen was not incorporated thereinto. Furthermore, about five drops of a 2% by mass xylene solution of a platinum complex was charged by using a syringe such that oxygen was not incorporated thereinto. After continuing stirring of this system at room temperature for about 30 hours, the reaction was finished. This reaction solution was first distilled at atmospheric pressure. After recovering the hexane and residual dichlorosilane, the system was evacuated by using a vacuum pump to start distillation of a desired silane compound. There was obtained the desired silane compound at a distillation temperature of 82 to 85° C. under about 20 Torr. This compound was confirmed to be the desired silane compound (aliphatic monomer (A1)) from chemical shift, branching and integration values of signals obtained by the ¹HNMR measurement (using chloroform as a heavy solvent at 400 MHz) (see FIG. 1). In the following polymerization reaction, a purified material obtained by vacuum distillation of this major distillate just before that was provided. Also, all of the solvents to be used were dried by a molecular sieve and then used.

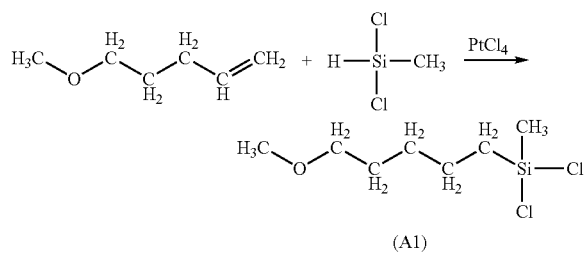

(A1)

Synthesis Example 2

Synthesis of Aliphatic Monomer (A2)

A round-bottom flask and an oil bath were prepared. A Dimroth condenser capable of being sealed with an inert gas was installed in the round-bottom flask, and a stirrer chip was put therein. The inside of the flask was subjected to deoxidation by using a vacuum pump. After returning the inside of the flask by using an inert gas, a hexane solution of the precursor A which is the high-purity olefin compound obtained in the foregoing Synthesis Example 1 was charged in the flask by using a syringe such that oxygen was not incorporated thereinto. Thereafter, dichloroethylsilane of about 1.5 times by mole or more of the olefin compound in the hexane solution (108.4 g or more or 0.840 moles or more) was charged in the flask by using a syringe such that oxygen was not incorporated thereinto. Furthermore, about five drops of a 2% by mass xylene solution of a platinum complex was charged by using a syringe such that oxygen was not incorporated thereinto. After continuing stirring of this system at room temperature for about 30 hours, the reaction was finished. This reaction solution was first distilled at atmospheric pressure. After recovering the hexane and residual dichlorosilane, the system was evacuated by using a vacuum pump to perform distillation of a desired silane compound. This compound was confirmed to be the desired silane compound (aliphatic monomer (A2)) from chemical shift, branching and integration values of signals obtained by the $^1$HNMR measurement. In the following polymerization reaction, a purified material obtained by vacuum distillation of this major distillate just before that was provided. Also, all of the solvents to be used were dried by a molecular sieve and then used.

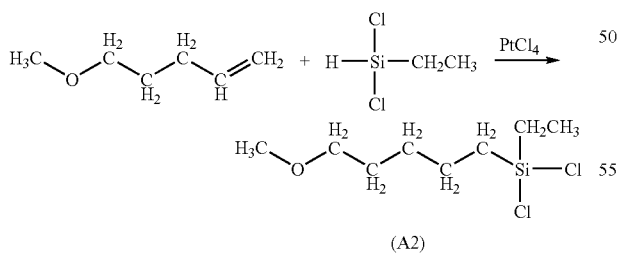

(A2)

Synthesis Example 3

Synthesis of Aromatic Monomer (B1)

Figure 2:
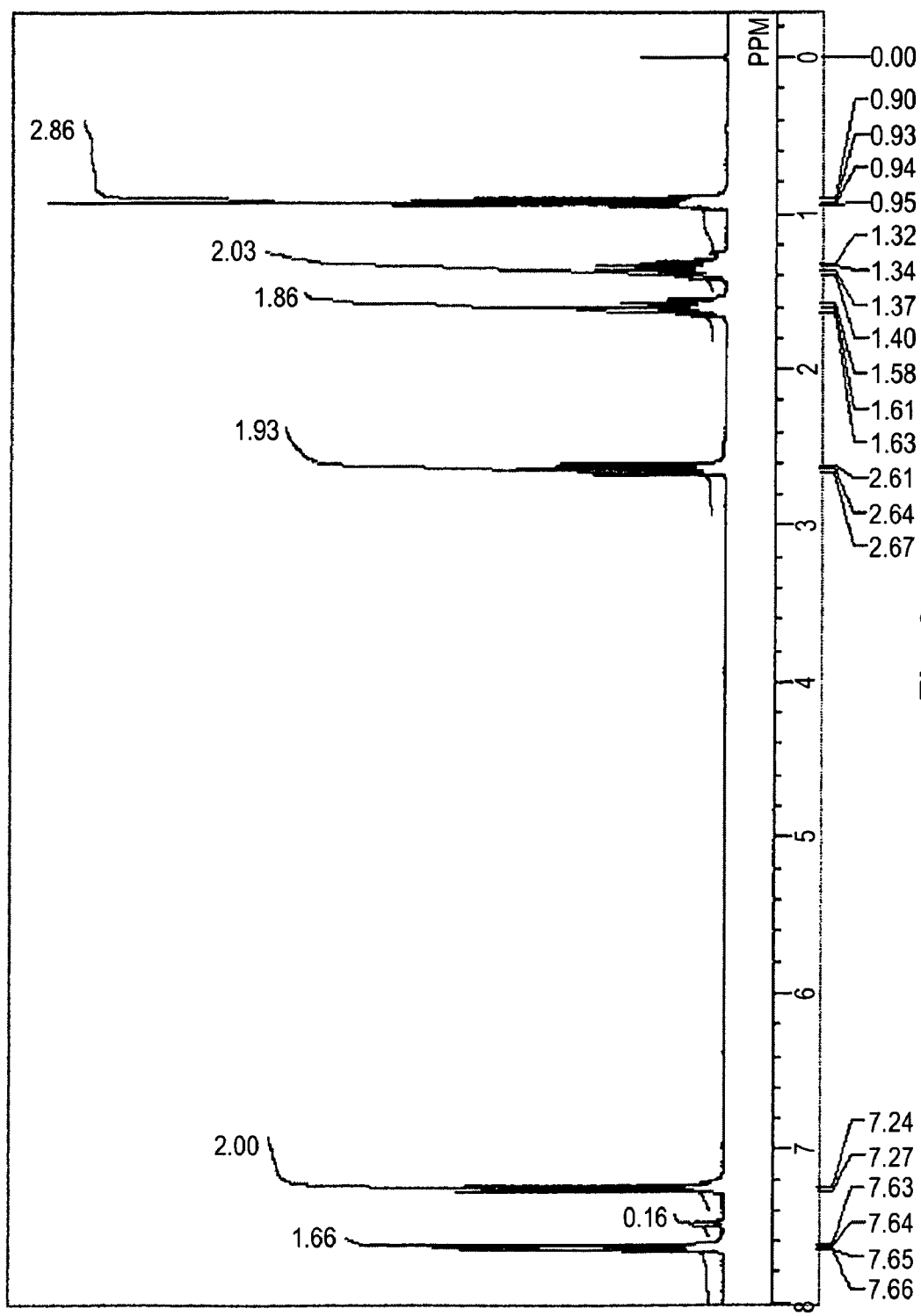
FIG. 2 is a chart of $^1$HNMR of a dichlorosilane compound (aromatic monomer (B1)) obtained in Synthesis Example 3.

A 3 L-volume four-necked flask equipped with a Dimroth condenser, a dropping funnel and a stirrer was charged with magnesium (15.7 g, 0.645 moles, in a flaky state), and the inside of the flask was purged with nitrogen. Diethyl ether (200 mL) was poured while keeping the inside of the flask at a positive pressure, and one piece of iodine was added while stirring. Furthermore, 1-bromo-4-butylbenzene (141.6 g, 0.665 moles) and diethyl ether (500 mL) were charged into the dropping funnel while keeping the inside of the flask at a positive pressure. When the diethyl ether was heated, and refluxing started, the diethyl ether solution of 1-bromo-4-butylbenzene was dropped from the dropping funnel under mild refluxing over about 4.5 hours, and the mixture was stirred for one hour as it was. After finishing stirring under heating, the reaction solution was cooled to room temperature and diluted with 300 mL of toluene. Tetrachlorosilane (44.6 g, 0.263 moles) and toluene (200 mL) were charged into the dropping funnel while keeping the inside of the flask at a positive pressure and dropped at room temperature over about 30 minutes. After completion of the dropping, stirring of the reaction solution was continued at room temperature overnight. A formed crystal of magnesium bromide was filtered, the obtained filtrate was concentrated, and the concentrated liquid was distilled in vacuo. 4-Butylphenyl trichlorosilane as an initial distillate and 48.5 g of pale yellow bis(4-butylphenyl)dichlorosilane (153 to 155° C./4 to 5 Torr) as a major distillate were obtained. This compound was confirmed to be the desired silane compound (aromatic monomer (B1)) from chemical shift, branching and integration values of signals obtained by the $^1$HNMR measurement (using chloroform as a heavy solvent at 400 MHz) (see FIG. 2). In the following polymerization reaction, a purified material obtained by vacuum distillation of this major distillate just before that was provided. Also, all of the solvents to be used were dried by a molecular sieve and then used.

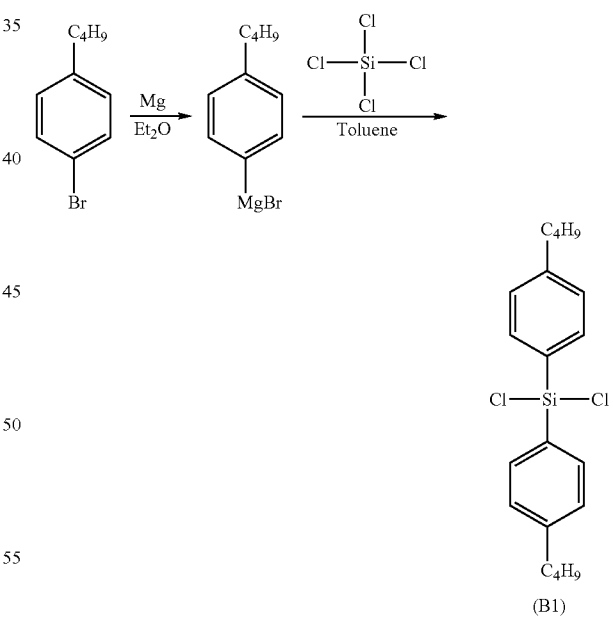

(B1)

Synthesis Example 4

Synthesis of Aromatic Monomer (B2)

A 3 L-volume four-necked flask equipped with a Dimroth condenser, a dropping funnel and a stirrer was charged with magnesium (15.7 g, 0.645 moles, in a flaky state), and the inside of the flask was purged with nitrogen. Diethyl ether (200 mL) was poured while keeping the inside of the flask at a positive pressure, and one piece of iodine was added while stirring. Furthermore, 1-bromo-4-hexylbenzene (160.9 g, 0.665 moles) and diethyl ether (500 mL) were charged into the dropping funnel while keeping the inside of the flask at a positive pressure. When the flask was heated, and refluxing started, the diethyl ether solution of 1-bromo-4-hexylbenzene was dropped from the dropping funnel under mild refluxing over about 4.5 hours, and the mixture was stirred for one hour as it was. After finishing stirring under heating, the reaction solution was cooled to room temperature and diluted with toluene. Tetrachlorosilane (44.6 g, 0.263 moles) and toluene (200 mL) were charged into the dropping funnel while keeping the inside of the flask at a positive pressure and dropped at room temperature over about 30 minutes. After completion of the dropping, stirring of the reaction solution was continued at room temperature overnight. A formed crystal of magnesium bromide was filtered, and the obtained filtrate was concentrated. The concentrated liquid was distilled in vacuo to obtain bis(4-hexylphenyl)dichlorosilane as a major distillate. This compound was confirmed to be the desired silane compound (aromatic monomer (B2) from chemical shift, branching and integration values of signals obtained by the $^1$HNMR measurement. In the following polymerization reaction, a purified material obtained by vacuum distillation of this major distillate just before that was provided. Also, all of the solvents to be used were dried by a molecular sieve and then used.

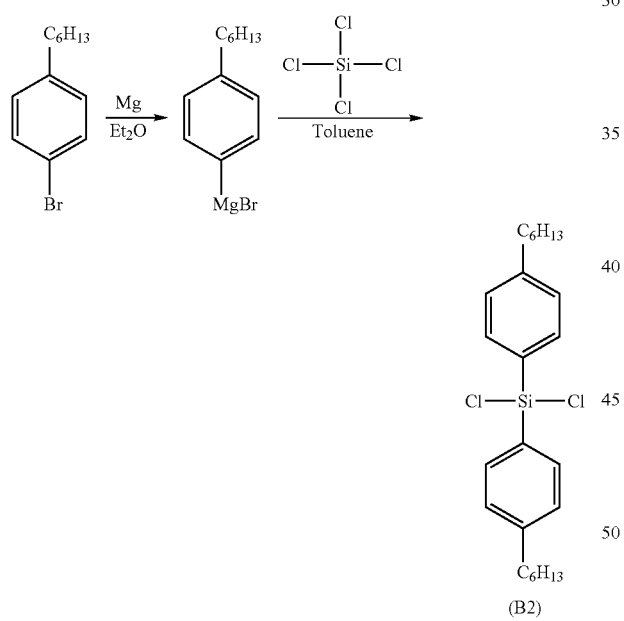

Example 1

Synthesis of Polysilane Compound (1)

A round-bottom flask, a mechanical stirrer and an oil bath were prepared. A Dimroth condenser capable of being sealed with an inert gas and a stirring rod provided with a semicircular blade were installed in the round-bottom flask, and the stirring rod was communicated with the mechanical stirrer. The inside of the flask was subjected to deoxidation by using a vacuum pump. After returning the inside of the flask to atmospheric pressure by using an inert gas, a solution of bis(4-butylphenyl)dichlorosilane (169.5 g, 0.464 moles) which is the aromatic monomer (B1) as prepared in Synthesis Example 3 and 5-methoxypentylmethyl dichlorosilane (97.93 g, 0.455 moles) which is the aliphatic monomer (A1) as prepared in Synthesis Example 1 in 229.1 g of toluene was charged in the flask by using a syringe such that oxygen and moisture were not incorporated thereinto. Thereafter, metallic sodium (44.10 g, 1.917 moles) stored in a mineral oil was charged while keeping the inside of the flask at a positive pressure by using an inert gas. Thereafter, the reaction system was raised to about 110° C., and stirring was continued for about 50 hours while keeping the temperature.

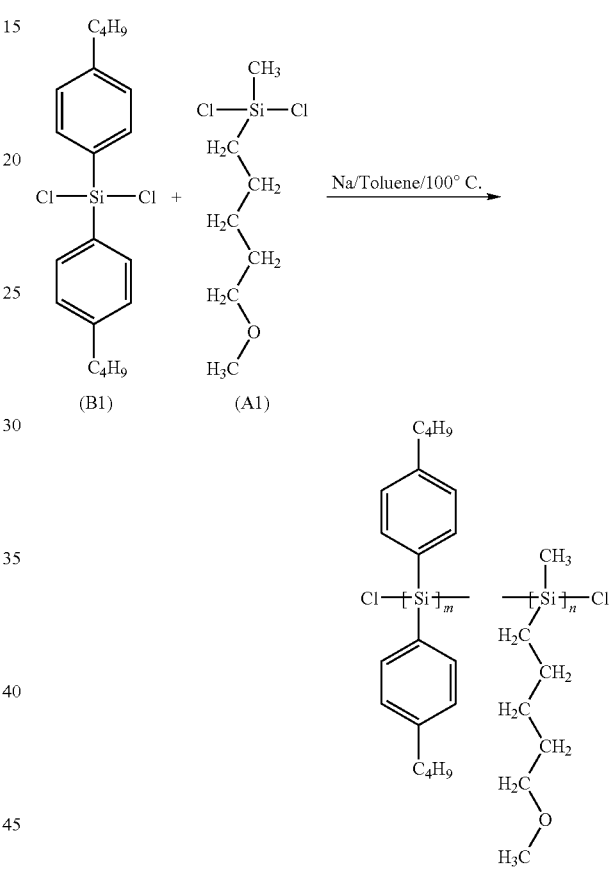

Figure 3:
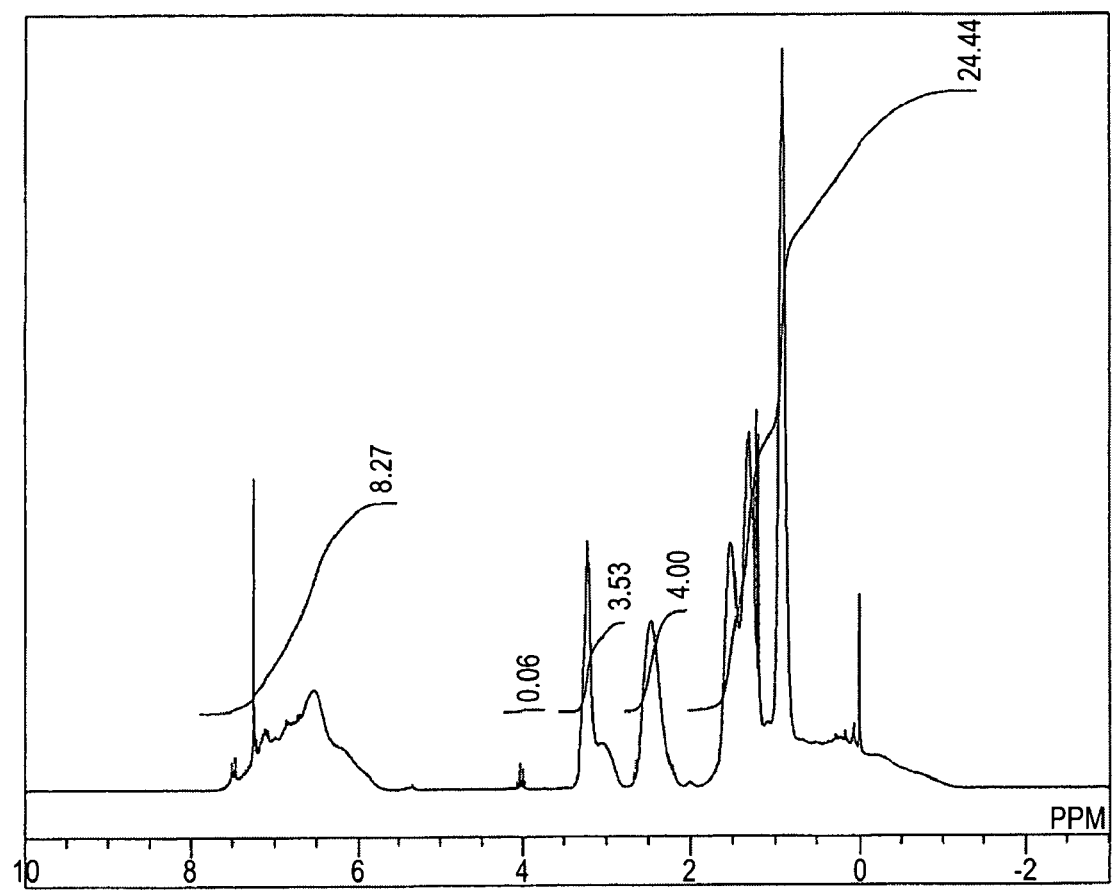
FIG. 3 is a chart of $^1$HNMR of a polysilane compound (1) obtained in Example 1.
Figure 4:
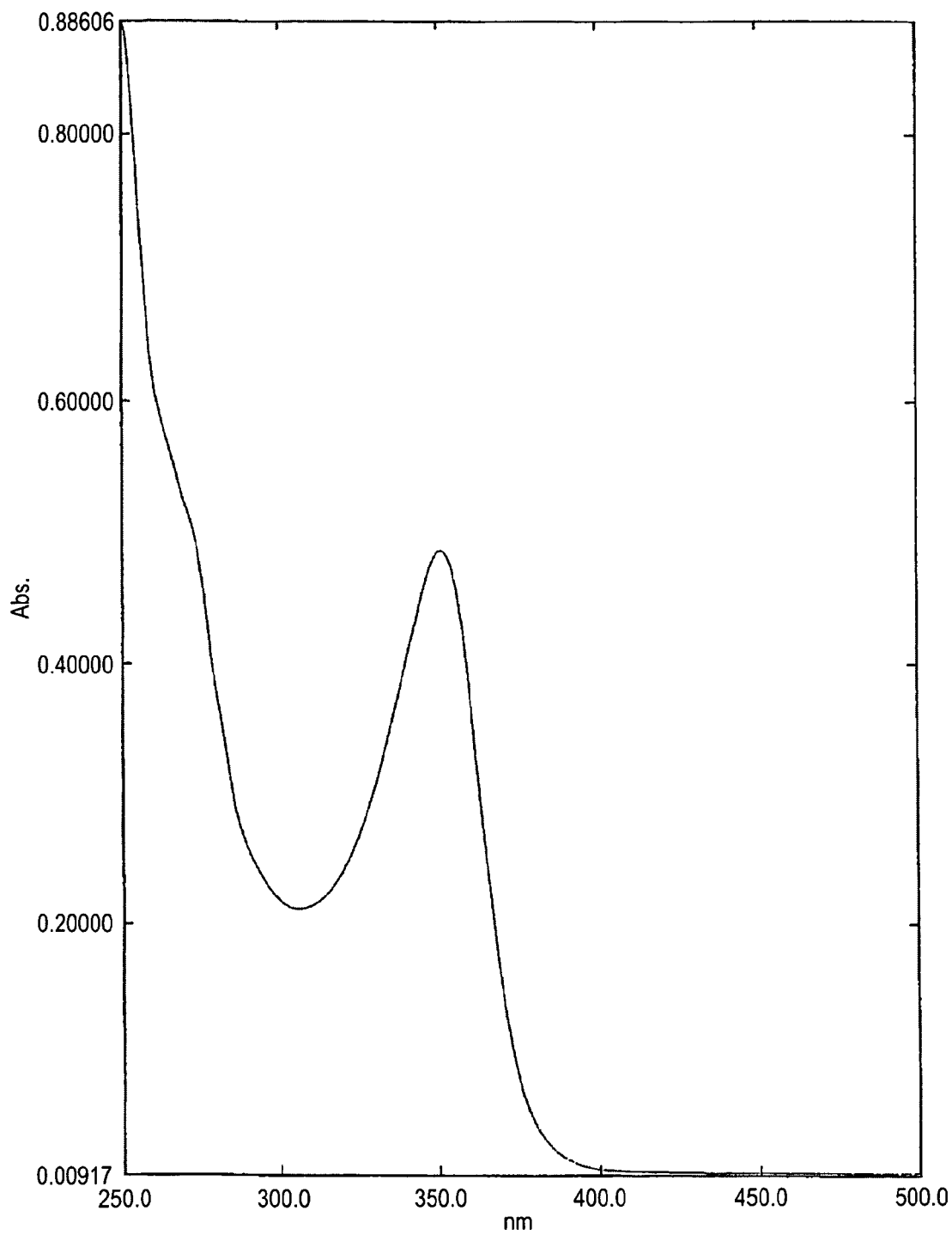
FIG. 4 is an absorption spectrum of a polysilane compound (1) obtained in Example 1.

After about 50 hours, trimethylchlorosilane of 0.4 times by mole of the charged silane compound (39.88 g, 0.3676 moles) was charged in the flask by using a syringe such that oxygen was not incorporated thereinto, and after continuing the reaction for an additional about 30 hours, the reaction was finished. After cooling to room temperature, the reaction solution was filtered to remove insoluble materials, the obtained filtrate was dropped in methanol, and a formed polymer was obtained as a precipitate. The yield was 7.63 g. This compound was confirmed to be the desired polysilane compound (1) from chemical shift, branching and integration values of signals obtained by the $^1$HNMR measurement (using chloroform as a heavy solvent at 400 MHz) (see FIG. 3). Furthermore, the measurement of molecular weight by GPC (eluate: THF, flow rate: 1 mL/min, detector: R1, weight average molecular weight: 679,531, number average molecular weight: 348,150, degree of polydispersion: 1.952, monomer ratio as a whole: 49/51) and the measurement of UV absorption by a spectrophotometer (measuring after preparing a dilute THF solution of the polysilane compound; using THF as a reference; absorption coefficient of maximum absorption: 5,980 (see FIG. 4)) were carried out. It was noted that the obtained polysilane compound (1) had a two-crest molecular weight distribution. The molecular weight and the absorption coefficient of maximum absorption at from 290 to 410 nm (maximum absorption coefficient) of the polysilane compound (1) are shown as E#27 in Table 2.

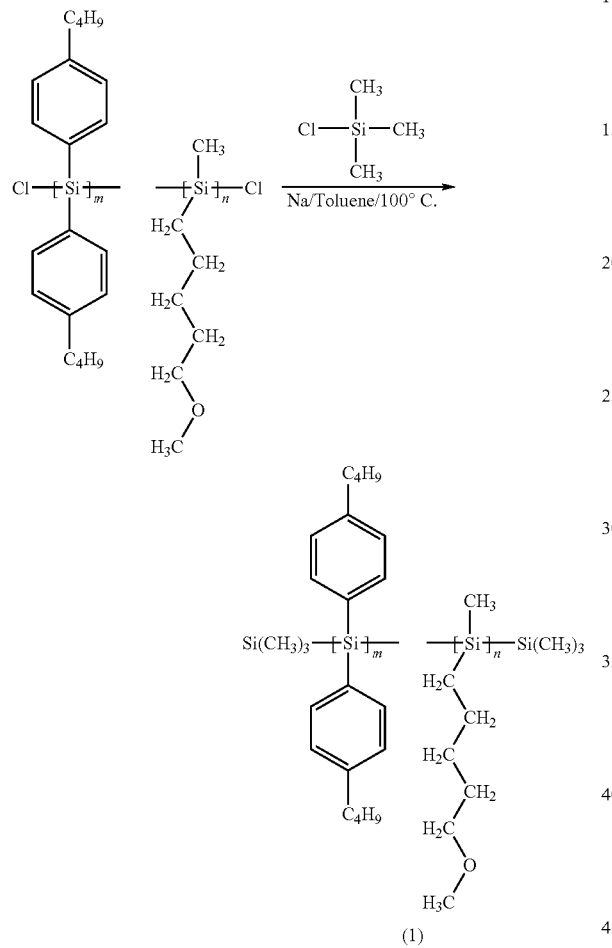

(1)

Example 2

Synthesis of Polysilane Compound (2)

A round-bottom flask, a mechanical stirrer and an oil bath were prepared. A Dimroth condenser capable of being sealed with an inert gas and the mechanical stirrer having a stirring rod provided with a semicircular blade were installed in the round-bottom flask. The inside of the flask was subjected to deoxidation by using a vacuum pump. After returning the inside of the flask by using an inert gas, a solution of bis(4-hexylphenyl)dichlorosilane (192.6 g, 0.464 moles) which is the aromatic monomer (B2) as prepared in Synthesis Example 4 and 5-methoxypentylmethyl dichlorosilane (97.93 g, 0.455 moles) which is the aliphatic monomer (A1) as prepared in Synthesis Example 1 in 229.1 g of toluene was charged in the flask by using a syringe such that oxygen and moisture were not incorporated thereinto. Thereafter, metallic sodium (44.10 g, 1.917 moles) stored in a mineral oil was charged while keeping the inside of the flask at a positive pressure by using an inert gas. Thereafter, the temperature was raised to about 110° C., and the reaction was continued for about 50 hours. After continuing the reaction for about 50 hours, trimethylchlorosilane of 0.4 times by mole of the charged silane compound (39.88 g, 0.3676 moles) was charged in the flask by using a syringe such that oxygen was not incorporated thereinto. After continuing the reaction for an additional about 30 hours, the reaction was finished. After cooling to room temperature, the reaction solution was filtered to remove insoluble materials such as by-products and residual sodium. The filtrate was dropped in methanol, and a formed polymer was obtained as a precipitate. This compound was confirmed to be the desired polysilane compound (2) from chemical shift, branching and integration values of signals obtained by the $^1$HNMR measurement.

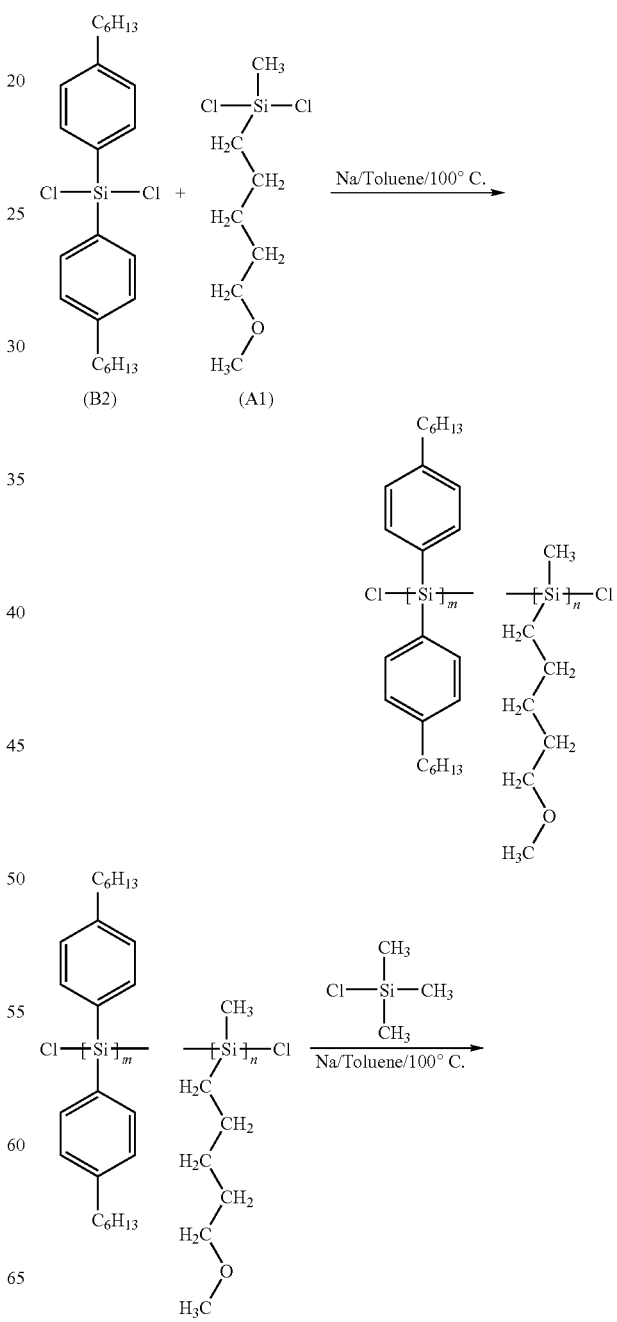

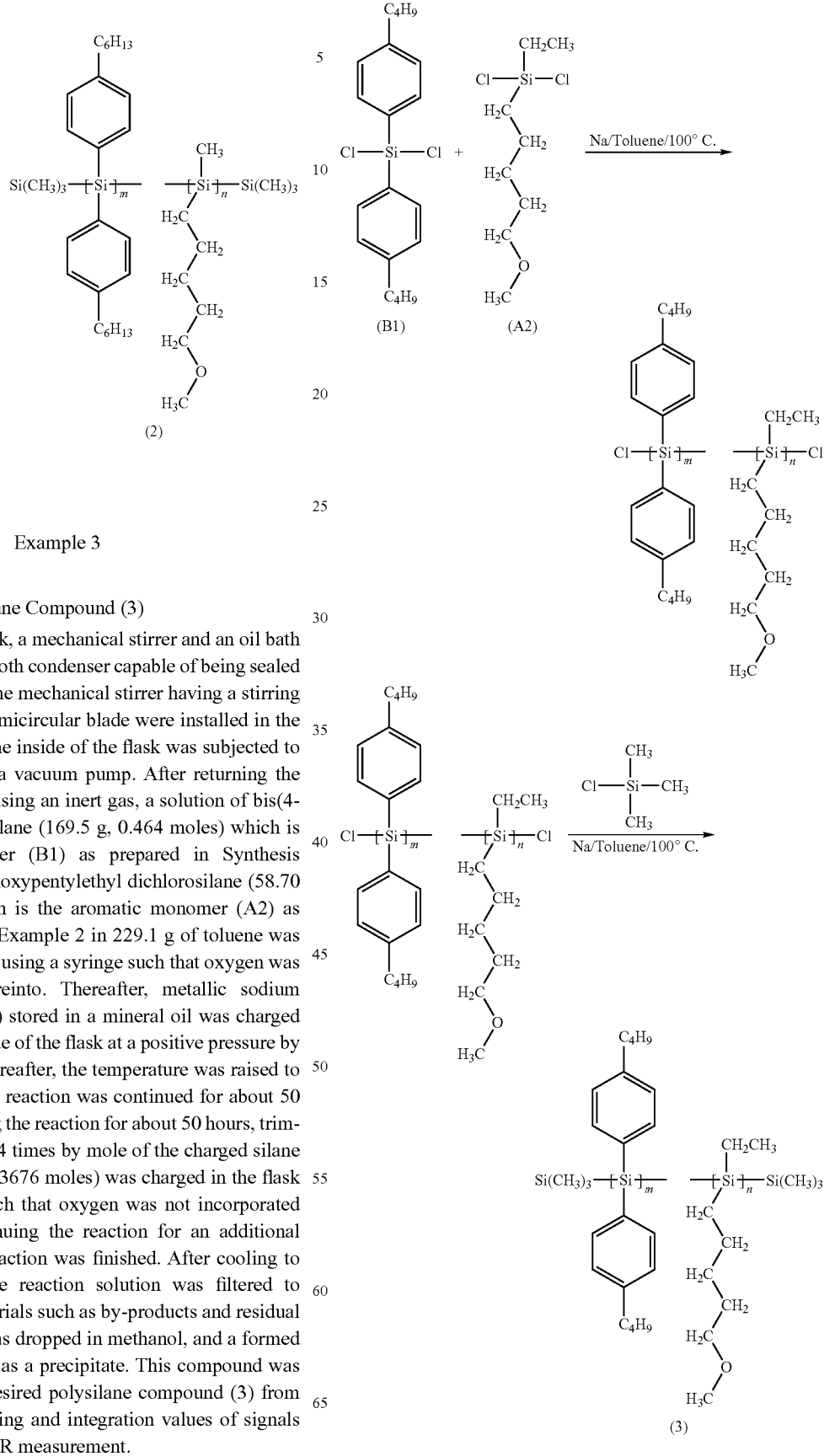

Example 3

Synthesis-1 of Polysilane Compound (3)

A round-bottom flask, a mechanical stirrer and an oil bath were prepared. A Dimroth condenser capable of being sealed with an inert gas and the mechanical stirrer having a stirring rod provided with a semicircular blade were installed in the round-bottom flask. The inside of the flask was subjected to deoxidation by using a vacuum pump. After returning the inside of the flask by using an inert gas, a solution of bis(4-butylphenyl)dichlorosilane (169.5 g, 0.464 moles) which is the aromatic monomer (B1) as prepared in Synthesis Example 3 and 5-methoxypentylethyl dichlorosilane (58.70 g, 0.455 moles) which is the aromatic monomer (A2) as prepared in Synthesis Example 2 in 229.1 g of toluene was charged in the flask by using a syringe such that oxygen was not incorporated thereinto. Thereafter, metallic sodium (44.10 g, 1.917 moles) stored in a mineral oil was charged while keeping the inside of the flask at a positive pressure by using an inert gas. Thereafter, the temperature was raised to about 110° C., and the reaction was continued for about 50 hours. After continuing the reaction for about 50 hours, trimethylchlorosilane of 0.4 times by mole of the charged silane compound (39.88 g, 0.3676 moles) was charged in the flask by using a syringe such that oxygen was not incorporated thereinto. After continuing the reaction for an additional about 30 hours, the reaction was finished. After cooling to room temperature, the reaction solution was filtered to remove insoluble materials such as by-products and residual sodium. The filtrate was dropped in methanol, and a formed polymer was obtained as a precipitate. This compound was confirmed to be the desired polysilane compound (3) from chemical shift, branching and integration values of signals obtained by the $^1$HNMR measurement.

Example 4

Synthesis-2 of Polysilane Compound (3)

A round-bottom flask, a mechanical stirrer and an oil bath were prepared. A Dimroth condenser capable of being sealed with an inert gas and a stirring rod provided with a semicircular blade were installed in the round-bottom flask, and the stirring rod was communicated with the mechanical stirrer. The inside of the flask was subjected to deoxidation by using a vacuum pump. After returning the inside of the flask to atmospheric pressure by using an inert gas, a solution of bis(4-butylphenyl)dichlorosilane (113.1 g, 0.309 moles) which is the aromatic monomer (B1) as prepared in Synthesis Example 3 and 5-methoxypentylethyl dichlorosilane (65.32 g, 0.303 moles) which is the aromatic monomer (A2) as prepared in Synthesis Example 2 in 152.8 g of toluene was charged in the flask by using a syringe such that oxygen and moisture were not incorporated thereinto. Thereafter, metallic sodium (29.41 g, 1.279 moles) stored in a mineral oil was charged while keeping the inside of the flask at a positive pressure by using an inert gas. Thereafter, the reaction system was raised to about 110° C., and stirring was continued for about 50 hours while keeping the temperature. After about 50 hours, trimethylchlorosilane of 0.4 times by mole of the charged silane compound (26.60 g, 0.2452 moles) was charged in the flask by using a syringe such that oxygen was not incorporated thereinto, and after continuing the reaction for an additional about 30 hours, the reaction was finished. After cooling to room temperature, the reaction solution was filtered to remove insoluble materials, the obtained filtrate was dropped in isopropyl alcohol, and a formed polymer was obtained as a precipitate. The yield was 6.10 g. This compound was confirmed to be the desired polysilane compound (3) from chemical shift, branching and integration values of signals obtained by the $^1$HNMR measurement. Furthermore, the measurement of molecular weight by GPC and the measurement of UV absorption by a spectrophotometer were carried out. It was noted that the obtained polysilane compound (3) had a two-crest molecular weight distribution. The molecular weight and the absorption coefficient of maximum absorption at from 290 to 410 nm (maximum absorption coefficient) of the polysilane compound (3) are shown as E#26 in Table 2.

Example 5

Synthesis-3 of Polysilane Compound (3)

A round-bottom flask, a mechanical stirrer and an oil bath were prepared. A Dimroth condenser capable of being sealed with an inert gas and a stirring rod provided with a semicircular blade were installed in the round-bottom flask, and the stirring rod was communicated with the mechanical stirrer. The inside of the flask was subjected to deoxidation by using a vacuum pump. After returning the inside of the flask to atmospheric pressure by using an inert gas, a solution of bis(4-butylphenyl)dichlorosilane (2.91 g, 0.008 moles) which is the aromatic monomer (B1) as prepared in Synthesis Example 3 and 5-methoxypentylethyl dichlorosilane (1.70 g, 0.008 moles) which is the aromatic monomer (A2) as prepared in Synthesis Example 2 in 0.5 mL of toluene was charged in the flask by using a syringe such that oxygen and moisture were not incorporated thereinto. Thereafter, metallic sodium (0.75 g, 0.0326 moles) stored in a mineral oil was charged while keeping the inside of the flask at a positive pressure by using an inert gas. Thereafter, the reaction system was raised to about 110° C., and stirring was continued for about 50 hours while keeping the temperature. After about 50 hours, trimethylchlorosilane of 0.4 times by mole of the charged silane compound (0.6944 g, 0.0064 moles) was charged in the flask by using a syringe such that oxygen was not incorporated thereinto, and after continuing the reaction for an additional about 30 hours, the reaction was finished. After cooling to room temperature, the reaction solution was filtered to remove insoluble materials, the obtained filtrate was dropped in isopropyl alcohol, and a formed polymer was obtained as a precipitate. The yield was 7.63 g. This compound was confirmed to be the desired polysilane compound (3) from chemical shift, branching and integration values of signals obtained by the $^1$HNMR measurement. Furthermore, the measurement of molecular weight by GPC and the measurement of UV absorption by a spectrophotometer were carried out. It was noted that the obtained polysilane compound (3) had a two-crest molecular weight distribution. The molecular weight and the absorption coefficient of maximum absorption at from 290 to 410 nm (maximum absorption coefficient) of the polysilane compound (3) are shown as S1010 in Table 2.

Comparative Example 1

Synthesis of Comparative Polysilane Compound (1)

A round-bottom flask, a mechanical stirrer and an oil bath were prepared. A Dimroth condenser capable of being sealed with an inert gas and a stirring rod provided with a semicircular blade were installed in the round-bottom flask, and the stirring rod was communicated with the mechanical stirrer. The inside of the flask was subjected to deoxidation by using a vacuum pump. After returning the inside of the flask to atmospheric pressure by using an inert gas, a solution of bis(4-butylphenyl)dichlorosilane (5.00 g, 0.0164 moles) which is the aromatic monomer (B1) as prepared in Synthesis Example 3 in 15.0 g of toluene was charged in the flask by using a syringe such that oxygen and moisture were not incorporated thereinto. Thereafter, metallic sodium (0.754 g, 0.0328 moles) stored in a mineral oil was charged while keeping the inside of the flask at a positive pressure by using an inert gas. Thereafter, the reaction system was raised to about 110° C., and stirring was continued for about 50 hours while keeping the temperature. After about 50 hours, trimethylchlorosilane of 0.4 times by mole of the charged silane compound (0.712 g, 0.00656 moles) was charged in the flask by using a syringe such that oxygen was not incorporated thereinto, and after continuing the reaction for an additional about 30 hours, the reaction was finished. After cooling to room temperature, the reaction solution was filtered to remove insoluble materials, the obtained filtrate was dropped in methanol, and a formed polymer was obtained as a precipitate. The yield was 7.63 g. This compound was confirmed to be the desired comparative polysilane compound (1) from chemical shift, branching and integration values of signals obtained by the $^1$HNMR measurement. Furthermore, the measurement of molecular weight by GPC and the measurement of UV absorption by a spectrophotometer were carried out. The molecular weight and the absorption coefficient of maximum absorption at from 290 to 410 nm (maximum absorption coefficient) of the comparative polysilane compound (1) are shown as E#18 in Table 2.

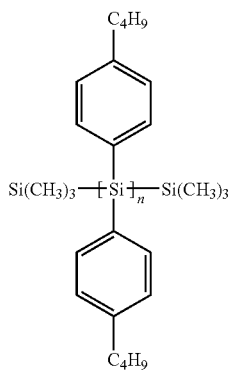

Comparative Polysilane Compound (1)

Comparative Example 2

Synthesis of Comparative Polysilane Compound (2)

A round-bottom flask, a mechanical stirrer and an oil bath were prepared. A Dimroth condenser capable of being sealed with an inert gas and a stirring rod provided with a semicircular blade were installed in the round-bottom flask, and the stirring rod was communicated with the mechanical stirrer. The inside of the flask was subjected to deoxidation by using a vacuum pump. After returning the inside of the flask to atmospheric pressure by using an inert gas, a solution of 5-methoxypentylethyl dichlorosilane (0.60 g (2.80 mmoles)) which is the aromatic monomer (A2) as prepared in Synthesis Example 2 in 1.2 g of toluene was charged in the flask by using a syringe such that oxygen and moisture were not incorporated thereinto. Thereafter, 0.0966 g (4.20 mmoles) of metallic sodium stored in a mineral oil was charged while keeping the inside of the flask at a positive pressure by using an inert gas. Thereafter, the reaction system was raised to about 110° C., and stirring was continued for about 50 hours while keeping the temperature. After about 50 hours, trimethylchlorosilane of 0.4 times by mole of the charged silane compound (0.122 g, 1.12 moles) was charged in the flask by using a syringe such that oxygen was not incorporated thereinto, and after continuing the reaction for an additional about 30 hours, the reaction was finished. After cooling to room temperature, the reaction solution was filtered to remove insoluble materials, the obtained filtrate was dropped in methanol, and a formed polymer was obtained as a precipitate. The yield was 7.63 g. This compound was confirmed to be the desired comparative polysilane compound (2) from chemical shift, branching and integration values of signals obtained by the $^1$HNMR measurement. Furthermore, the measurement of molecular weight by GPC and the measurement of UV absorption by a spectrophotometer were carried out. It was noted that the obtained comparative polysilane compound (2) had a two-crest molecular weight distribution. The molecular weight and the absorption coefficient of maximum absorption at from 290 to 410 nm (maximum absorption coefficient) of the comparative polysilane compound (2) are shown as E#5 in Table 2.

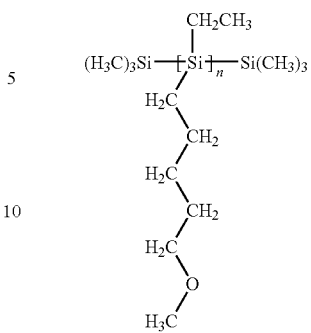

Comparative Polysilane Compound (2)

The relationship between the molecular weight and the absorption coefficient of maximum absorption at from 290 to 410 nm (maximum absorption coefficient) of the polysilane compounds obtained in the foregoing Examples and Comparative Examples is shown in the following Table 2.

TABLE 2

Relationship between molecular weight and absorption coefficient of maximum absorption of synthesized polysilane

| Experimental No. | | Molecular weight | Absorption coefficient |
|---|---|---|---|
| E#5 | Larger molecular weight | 150,000 | 5,010 |
| | Smaller molecular weight | 2,000 | |
| | Averaged molecular weight | 76,000 | |
| E#18 | | 1,533 | 834 |
| E#26 | Larger molecular weight | 240,000 | 7,180 |
| | Smaller molecular weight | 6,000 | |
| | Averaged molecular weight | 123,000 | |
| E#27 | Larger molecular weight | 680,000 | 5,980 |
| | Smaller molecular weight | 15,000 | |
| | Averaged molecular weight | 347,500 | |
| S1010 | Larger molecular weight | 760,000 | 6,600 |
| | Smaller molecular weight | 130,000 | 6,600 |
| | Averaged molecular weight | 445,000 | |

Figure 5:
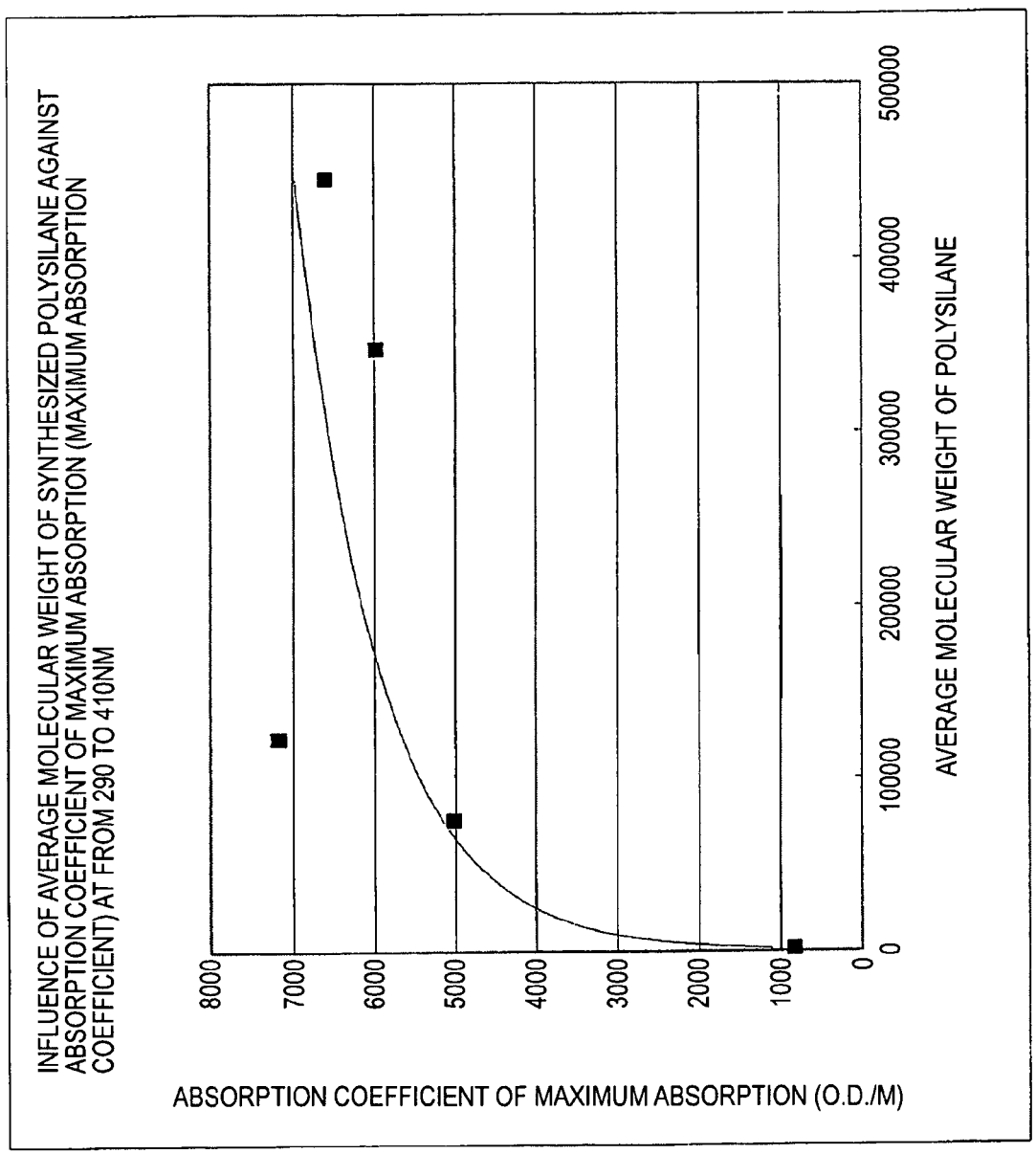
FIG. 5 is a graph showing an influence of an average molecular weight of a synthesized polysilane against an absorption coefficient of maximum absorption (maximum absorption coefficient) at from 290 to 410 nm.

As shown in FIG. 5, it is understood from the relationship between the average molecular weight and the absorption coefficient of maximum absorption as obtained in Table 2 that when the average molecular weight of a polysilane is about 5,000 or more, its absorption coefficient exceeds 2,000. It is noted that since the polysilane compounds of the formula (1) of the invention can be synthesized so as to have a higher average molecular weight than that of the comparative polysilane compounds, they are able to increase the absorption coefficient and have high activity as a photopolymerization initiator.

Next, examples of an ultraviolet ray-curable ink composition containing the polysilane compound represented by the formula (I) of the invention are described.

[Preparation of Pigment Dispersion]

Ethylene glycol monoallyl ether as a monomer was added to 15 parts by mass of C.I. Pigment Black 7 (carbon black) as a coloring agent and 6.0 parts by mass of DISCOALL N-509 (manufactured by Dainichiseika Color & Chemicals Mfg. Co., Ltd.) as a dispersant to make the whole to 100 parts by mass and mixed and stirred to obtain a mixture. This mixture was subjected to a dispersion treatment together with zirconia beads (diameter: 1.5 mm) for 6 hours by using a sand mill (manufactured by Yasukawa Seisakusho). Thereafter, the zirconia beads were separated by a separator to obtain a black pigment dispersion ("Pigment Black-7" in Table 3 as described later).

Pigment dispersions corresponding to respective colors, namely a cyan pigment dispersion ("Pigment Blue-15:3" in Table 3 as described later), a magenta pigment dispersion ("Pigment Violet-19" in Table 3 as described later) and a yellow pigment dispersion ("Pigment Yellow-155" in Table 3 as described later) were prepared in the same manner as described previously.

Example 6

Preparation of Ink Compositions 1-1 to 1-4; See Table 3 as Described Later

MEDOL-10 (acrylic monomer, manufactured by Osaka Organic Chemical Industry Ltd.), VISCOAT #360 (trimethylolpropane modified triacrylate as a polyfunctional monomer, which is manufactured by Osaka Organic Chemical Industry Ltd.), the polysilane compound (1) obtained in Example 1 and a dispersant (polyoxyalkylene polyalkylene polyamine) were mixed in a composition (parts by mass) as shown in Table 3 as described later, to which was then dropped the foregoing pigment dispersion (Pigment Black-7, Pigment Blue-15:3, Pigment Violet-19 or Pigment Yellow-155) while stirring (see the dropping amount as shown in Table 3 as described later). After completion of the dropping, the mixture was mixed and stirred at normal temperature for one hour and further filtered through a 5-μm membrane filter to obtain each of ink compositions 1-1 to 1-4 of Example 6.

The ink compositions 1-1 to 1-4 of Example 6 are shown in Table 3.

Also, each of these ink compositions was measured with respect to "viscosity at 20° C. (unit: mPa·s)", and the results are shown in Table 3. Furthermore, each of these ink compositions was subjected to "curing properties test", "pencil hardness test", "printing test" and "storage stability test". The results of these tests (evaluations) are also shown in Table 3.

[Curing Properties Test]

Each of the ink compositions 1-1 to 1-4 of the foregoing Example was dropped on a glass substrate and subjected to a curing treatment with ultraviolet rays having a wavelength of 365 nm under short-time and low-light amount conditions at an irradiation intensity of 17 mW/cm$^2$ for an irradiation time of 6 seconds in an integrated light amount of 102 mJ/cm$^2$. Thereafter, the resulting ink composition was evaluated according to the following evaluation criteria (visual evaluation of curing properties).

Evaluation Criteria

A: The ink composition is completely cured.

B: The ink composition is substantially cured but not completely.

C: The ink composition is partially cured.

[Pencil Hardness Test]

A sample having been subjected to a curing treatment in the foregoing method was evaluated for hardness in a method as specified in JIS K5400 (pencil scratch test, handwriting method).

[Printing Test]

By using an inkjet printer, PX-G900, manufactured by Seiko Epson corporation, each of the ink compositions 1-1 to 1-4 of the foregoing Example was subjected to solid pattern printing at normal temperature and atmospheric pressure by using an OHP film (XEROX FILM (with no frame), available from Fuji Xerox Co., Ltd.) as a recording medium, subjected to printing and curing treatments by an ultraviolet ray irradiation device placed in a paper output port under a curing condition in an integrated light amount of 90 mJ/cm$^2$ and then evaluated according to the following evaluation criteria (visual evaluation of curing properties).

Evaluation Criteria

A: The ink composition is cured in a thin film state on the OHP film.

B: The ink composition is not completely cured on the OHP film.

[Storage Stability Test]

Each of the foregoing light-curable ink compositions was allowed to stand under an atmosphere of 60° C.×7 days; an initial viscosity (mPa·s) and a viscosity after standing were measured by a rheometer (MCR-300, manufactured by Physica); and a rate of change of the viscosity was evaluated according to the following criteria. The initial viscosity and the viscosity after standing were measured at 20° C.

AA: The rate of change between the initial viscosity and the viscosity after standing is less than ±5%.

A: The rate of change between the initial viscosity and the viscosity after standing is ±5% or more and less than ±20%.

B: The rate of change between the initial viscosity and the viscosity after standing is ±20% or more.

TABLE 3

|  | Example 6 | | | |
| --- | --- | --- | --- | --- |
|  | Ink composition 1-1 | Ink composition 1-2 | Ink composition 1-3 | Ink composition 1-4 |
| MEDOL-10 (manufactured by Osaka Organic Chemical Industry Ltd.) | 74.0 | 74.0 | 74.0 | 74.0 |
| VISCOAT #360 (manufactured by Osaka Organic Chemical Industry Ltd.) | 14.0 | 14.0 | 14.0 | 14.0 |
| Polysilane compound (1) obtained in Example 1 | 6.0 | 6.0 | 6.0 | 6.0 |
| Pigment Black-7 | 5.0 | — | — | — |
| Pigment Blue-15:3 | — | 5.0 | — | — |
| Pigment Violet-19 | — | — | 5.0 | — |
| Pigment Yellow-155 | — | — | — | 5.0 |
| Dispersant (polyoxyalkylene polyalkylene polyamine) | 1.0 | 1.0 | 1.0 | 1.0 |
| Viscosity at 20° C. (unit: mPa · s) | 12.7 | 12.6 | 12.4 | 12.9 |
| Results of curing properties test | A | A | A | A |
| Results of pencil hardness test | 3H | 3H | 3H | 3H |
| Results of printing test | A | A | A | A |
| Results of storage stability test | AA | AA | AA | AA |

(Unit: parts by mass)

Example 7

Preparation of Ink Compositions 2-1 to 2-4; See Table 4 as Described Later

MEDOL-10, VISCOAT #360, the polysilane compound (2) obtained in Example 2, a dispersant (polyoxyalkylene polyalkylene polyamine) and a pigment dispersion solution were mixed in a composition as shown in Table 4 as described later. Thereafter, the mixture was mixed and stirred at normal temperature for one hour and further filtered through a 5-μm membrane filter to obtain each of ink compositions 2-1 to 2-4 of Example 7.

The ink compositions 2-1 to 2-4 of Example 7 are shown in Table 4.

Similar to Example 6, the results of each of these ink compositions with respect to "viscosity at 20° C. (unit: mPa·s)", "curing properties test", "pencil hardness test", "printing test" and "storage stability test" are shown in Table 4.

Ltd.) and VISCOAT #1000 which is a (meth)acryloyl group-containing dendritic polymer (manufactured by Osaka Organic Chemical Industry Ltd.) were used as polymerizable compounds, and the polysilane compound (3) obtained in Example 3, a dispersant and a pigment dispersion solution were mixed in a composition as shown in Table 5 as described later. Thereafter, the mixture was mixed and stirred at normal temperature for one hour and further filtered through a 5-μm membrane filter to obtain each of ink compositions 3-1 to 3-4 of Example 8.

The ink compositions 3-1 to 3-4 of Example 8 are shown in Table 8.

TABLE 4

|  | Example 7 | | | |
| --- | --- | --- | --- | --- |
|  | Ink composition 2-1 | Ink composition 2-2 | Ink composition 2-3 | Ink composition 2-4 |
| MEDOL-10 (manufactured by Osaka Organic Chemical Industry Ltd.) | 70.0 | 70.0 | 70.0 | 70.0 |
| VISCOAT #360 (manufactured by Osaka Organic Chemical Industry Ltd.) | 21.0 | 21.0 | 21.0 | 21.0 |
| Polysilane compound (2) obtained in Example 2 | 3.0 | 3.0 | 3.0 | 3.0 |
| Pigment Black-7 | 5.0 | — | — | — |
| Pigment Blue-15:3 | — | 5.0 | — | — |
| Pigment Violet-19 | — | — | 5.0 | — |
| Pigment Yellow-155 | — | — | — | 5.0 |
| Dispersant (polyoxyalkylene polyalkylene polyamine) | 1.0 | 1.0 | 1.0 | 1.0 |
| Viscosity at 20° C. (unit: mPa · s) | 14.2 | 14.5 | 14.4 | 14.7 |
| Results of curing properties test | A | A | A | A |
| Results of pencil hardness test | 3H | 3H | 3H | 3H |
| Results of printing test | A | A | A | A |
| Results of storage stability test | AA | AA | AA | AA |

(Unit: parts by mass)

Example 8

Preparation of Ink Compositions 3-1 to 3-4; See Table 5 as Described Later

Allyl glycol (manufactured by Nippon Nyukazai Co., Ltd.), N-vinylformamide (manufactured by Dia-Nitrix Co., Similar to Example 6, the results of each of these ink compositions with respect to "viscosity at 20° C. (unit: mPa·s)", "curing properties test", "pencil hardness test", "printing test" and "storage stability test" are shown in Table 5.

TABLE 5

|  | Example 8 | | | |
| --- | --- | --- | --- | --- |
|  | Ink composition 3-1 | Ink composition 3-2 | Ink composition 3-3 | Ink composition 3-4 |
| Allyl glycol (manufactured by Nippon Nyukazai Co., Ltd.) | 53.0 | 53.0 | 53.0 | 53.0 |
| N-Vinylformamide (manufactured by Dia-Nitrix Co., Ltd.) | 25.0 | 25.0 | 25.0 | 25.0 |
| VISCOAT #1000 (manufactured by Osaka Organic Chemical Industry Ltd.) | 12.2 | 12.2 | 12.2 | 12.2 |
| Polysilane compound (3) obtained in Example 3 | 4.0 | 4.0 | 4.0 | 4.0 |
| Pigment Black-7 | 5.0 | — | — | — |
| Pigment Blue-15:3 | — | 5.0 | — | — |
| Pigment Violet-19 | — | — | 5.0 | — |
| Pigment Yellow-155 | — | — | — | 5.0 |
| Dispersant (polyoxyalkylene polyalkylene polyamine) | 0.8 | 0.8 | 0.8 | 0.8 |
| Viscosity at 20° C. (unit: mPa · s) | 9.6 | 9.4 | 9.7 | 9.3 |
| Results of curing properties test | A | A | A | A |
| Results of pencil hardness test | 3H | 3H | 3H | 3H |
| Results of printing test | A | A | A | A |
| Results of storage stability test | AA | AA | AA | AA |

(Unit: parts by mass)

Comparative Example 3
Preparation of Comparative Ink Compositions 1-1 to 1-4; See Table 6 as Described Later The polysilane compound (E#18) synthesized in Comparative Example 1 was used as a photopolymerization initiator, and other components the same as those in Example 6 were mixed in a composition as shown in Table 6 as described later. Thereafter, the mixture was mixed and stirred at normal temperature for one hour and further filtered through a 5-μm membrane filter to obtain each of comparative ink compositions 1-1 to 1-4 of Comparative Example 3.

Comparative Example 4
Preparation of Comparative Ink Compositions 2-1 to 2-4; See Table 7 as Described Later IRGACURE 1800 (available from Ciba Specialty Chemicals) was used as a photopolymerization initiator in place of the polysilane, and other components the same as those in Example 8 were mixed in a composition as shown in Table 7 as described later. Thereafter, the mixture was mixed and stirred at normal temperature for one hour and further filtered through a 5-μm membrane filter to obtain each of comparative ink compositions 2-1 to 2-4 of Comparative Example 4.

The comparative ink compositions 1-1 to 1-4 of Comparative Example 3 are shown in Table 6; and the comparative ink compositions 2-1 to 2-4 of Comparative Example 4 are shown in Table 7.

Similar to Examples 6 and 8, the results of each of these ink compositions with respect to "viscosity at 20° C. (unit: mPa·s)", "curing properties test", "pencil hardness test", "printing test" and "storage stability test" are shown in Tables 6 and 7.

TABLE 6

|  | Comparative Example 3 | | | |
| --- | --- | --- | --- | --- |
|  | Ink composition 1-1 | Ink composition 1-2 | Ink composition 1-3 | Ink composition 1-4 |
| MEDOL-10 (manufactured by Osaka Organic Chemical Industry Ltd.) | 74.0 | 74.0 | 74.0 | 74.0 |
| VISCOAT #360 (manufactured by Osaka Organic Chemical Industry Ltd.) | 14.0 | 14.0 | 14.0 | 14.0 |
| E#18 polysilane compound | 6.0 | 6.0 | 6.0 | 6.0 |
| Pigment Black-7 | 5.0 | — | — | — |
| Pigment Blue-15:3 | — | 5.0 | — | — |
| Pigment Violet-19 | — | — | 5.0 | — |
| Pigment Yellow-155 | — | — | — | 5.0 |
| Dispersant (polyoxyalkylene polyalkylene polyamine) | 1.0 | 1.0 | 1.0 | 1.0 |
| Viscosity at 20° C. (unit: mPa · s) | 11.8 | 11.7 | 12.1 | 11.9 |
| Results of curing properties test | C | B | B | B |
| Results of pencil hardness test | — | B | B | B |
| Results of printing test | C | C | C | C |
| Results of storage stability test | AA | AA | AA | AA |

(Unit: parts by mass)

TABLE 7

|  | Comparative Example 4 | | | |
| --- | --- | --- | --- | --- |
|  | Ink composition 2-1 | Ink composition 2-2 | Ink composition 2-3 | Ink composition 2-4 |
| Allyl glycol (manufactured by Nippon Nyukazai Co., Ltd.) | 53.0 | 53.0 | 53.0 | 53.0 |
| N-Vinylformamide (manufactured by Dia-Nitrix Co., Ltd.) | 25.0 | 25.0 | 25.0 | 25.0 |
| VISCOAT #1000 (manufactured by Osaka Organic Chemical Industry Ltd.) | 12.2 | 12.2 | 12.2 | 12.2 |
| IRGACURE 1800 (manufactured by Ciba Specialty Chemicals) | 4.0 | 4.0 | 4.0 | 4.0 |
| Pigment Black-7 | 5.0 | — | — | — |
| Pigment Blue-15:3 | — | 5.0 | — | — |
| Pigment Violet-19 | — | — | 5.0 | — |
| Pigment Yellow-155 | — | — | — | 5.0 |
| Dispersant (polyoxyalkylene polyalkylene polyamine) | 0.8 | 0.8 | 0.8 | 0.8 |
| Viscosity at 20° C. (unit: mPa · s) | 8.5 | 8.7 | 8.3 | 8.9 |
| Results of curing properties test | C | B | B | C |
| Results of pencil hardness test | — | H | H | — |
| Results of printing test | C | A | A | C |
| Results of storage stability test | B | B | B | B |

(Unit: parts by mass)

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2007-35436 (filed Feb. 15, 2007) and 2008-30637 (filed Feb. 12, 2008) and the contents thereof are therein incorporated by reference.

What is claimed is:

1. A polysilane compound having a structure represented by the following formula 1:

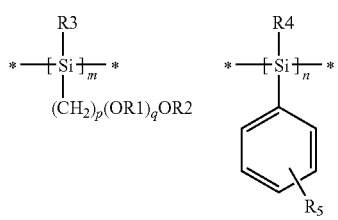

formula 1 wherein
- m and n each represents a molar ratio and is a positive number which is satisfied with (m+n)=1, p represents an integer of 2 or more and not more than 10, and q represents an integer of 0 or more and not more than 5;
- R1 represents —$CH_2CH_2$— or —$CH_2CH(CH_3)$—;
- R2 and R3 each independently represents an alkyl group having from 1 to 12 carbon atoms, a phenyl group or a benzyl group, and the phenyl group and the benzyl group may be each further substituted with a substituent X1;
- R4 represents a phenyl group, and the phenyl group may be further substituted with a substituent X1;
- R5 represents an alkyl group having from 1 to 12 carbon atoms, an alkoxy group having from 1 to 12 carbon atoms, a halogen group, a cyano group, an acyl group, an acyloxy group, a benzoyl group or a nitro group; and
- the substituent X1 represents an alkyl group having from 1 to 12 carbon atoms, an alkoxy group having from 1 to 12 carbon atoms, a halogen group, a cyano group, an acyl group, an acyloxy group, a benzoyl group or a nitro group.

2. The polysilane compound according to claim 1, having a maximum absorption coefficient at from 290 nm to 410 nm of 1,000 or more.

3. The polysilane compound according to claim 1, having an average molecular weight of 5,000 or more.

4. The polysilane compound according to claim 1, which is soluble in a hydrophilic acrylate.

5. A synthesis method of the polysilane compound according to claim 1, comprising synthesizing a monomer by using a bromide as a starting raw material and then performing copolymerization using the monomer.

6. An ultraviolet ray-curable ink composition containing the polysilane compound according to claim 1.

7. An inkjet recording method comprising recording on a recording medium the ultraviolet ray-curable ink composition according to claim 6.

8. An ink container containing the ultraviolet ray-curable ink composition according to claim 6 therein.

9. An inkjet recording apparatus containing the ultraviolet ray-curable ink composition according to claim 6 therein.

* * * * *